(12) United States Patent
Schacht et al.

(10) Patent No.: US 12,331,527 B2
(45) Date of Patent: Jun. 17, 2025

(54) PANEL AND METHOD FOR MANUFACTURING SUCH A PANEL

(71) Applicant: FLOORING INDUSTRIES LIMITED, SARL, Bertrange (LU)

(72) Inventors: Benny Schacht, Vlamertinge (BE); Jan De Rick, Geraardsbergen (BE)

(73) Assignee: UNILIN BV, Wielsbeke (BE)

( * ) Notice: Subject to any disclaimer, the term of this patent is extended or adjusted under 35 U.S.C. 154(b) by 0 days.

(21) Appl. No.: 18/463,523

(22) Filed: Sep. 8, 2023

(65) Prior Publication Data

US 2023/0417064 A1 Dec. 28, 2023

Related U.S. Application Data

(63) Continuation of application No. 17/296,760, filed as application No. PCT/IB2019/060116 on Nov. 25, 2019, now Pat. No. 11,834,843.

(60) Provisional application No. 62/862,850, filed on Jun. 18, 2019.

(30) Foreign Application Priority Data

Nov. 27, 2018 (BE) .................................... 2018/5830
Jul. 4, 2019 (DE) ..................... 20 2019 103 690.7

(51) Int. Cl.
*E04F 15/00* (2006.01)
*E04F 15/02* (2006.01)

(52) U.S. Cl.
CPC .. *E04F 15/02038* (2013.01); *E04F 15/02005* (2013.01); *E04F 2201/0115* (2013.01); *E04F 2201/0161* (2013.01)

(58) Field of Classification Search
CPC .......... E04F 15/02005; E04F 15/02038; E04F 15/107; E04F 15/102; E04F 2201/042; E04F 2201/0107; E04F 2201/03; E04F 15/105; E04F 2201/0115; E04F 2201/0153; E04F 2201/0552; E04F 2201/023; E04F 2201/0535; E04F 2201/0146; E04F 2201/043; E04F 2201/0547; E04F 2201/0138; E04F 2201/0161; E04F 15/04; E04F 15/08; B32B 2471/00; B27F 1/06
See application file for complete search history.

(56) References Cited

U.S. PATENT DOCUMENTS 7,127,860 B2 10/2006 Pervan et al.
7,275,350 B2 10/2007 Pervan et al.
7,779,601 B2  8/2010 Pervan et al.
(Continued)

FOREIGN PATENT DOCUMENTS

CN       1555451 A    12/2004
CN       1886567 A    12/2006
(Continued)

OTHER PUBLICATIONS

International Search Report with Written Opinion from PCT Application No. PCT/IB2019/060116, Apr. 7, 2020.
(Continued)

*Primary Examiner* — Chi Q Nguyen
(74) *Attorney, Agent, or Firm* — Workman Nydegger

(57) ABSTRACT

A rectangular panel has long and short edges, such that on each long edge and on each short edge, the panel has a coupling part, which allows the panel to be coupled to another similar panel.

20 Claims, 12 Drawing Sheets

(56) References Cited

U.S. PATENT DOCUMENTS

| | | |
|---|---|---|
| 8,499,521 B2 | 8/2013 | Pervan et al. |
| 8,839,584 B2 * | 9/2014 | Sokol ................... E04F 15/02 |
| | | 52/586.1 |
| 8,991,055 B2 | 3/2015 | Cappelle |
| 9,695,600 B2 * | 7/2017 | Vandevoorde .......... B32B 29/06 |
| 9,885,187 B2 * | 2/2018 | Kell ................ E04F 15/02033 |
| 10,041,258 B2 | 8/2018 | Pervan |
| 10,626,620 B2 | 4/2020 | Pervan |
| 10,704,269 B2 * | 7/2020 | Whispell ................ E04F 15/02 |
| 10,808,410 B2 * | 10/2020 | Boo .................. E04F 15/02033 |
| 11,359,384 B2 | 6/2022 | Markovski et al. |
| 11,391,050 B2 | 7/2022 | Pervan |
| 11,834,843 B2 * | 12/2023 | Schacht ............... B32B 27/304 |
| 2002/0007609 A1 | 1/2002 | Pervan |
| 2003/0101674 A1 | 6/2003 | Pervan et al. |
| 2004/0031225 A1 | 2/2004 | Fowler |
| 2005/0210810 A1 | 9/2005 | Pervan |
| 2006/0032168 A1 | 2/2006 | Thiers et al. |
| 2006/0075713 A1 | 4/2006 | Pervan et al. |
| 2008/0000194 A1 | 1/2008 | Pervan et al. |
| 2009/0260313 A1 | 10/2009 | Segaert |
| 2010/0018149 A1 | 1/2010 | Thiers |
| 2010/0293879 A1 | 11/2010 | Pervan et al. |
| 2011/0173914 A1 * | 7/2011 | Engstrom ......... E04F 15/02038 |
| | | 52/582.2 |
| 2012/0017534 A1 * | 1/2012 | Oh ....................... E04F 15/102 |
| | | 52/588.1 |
| 2012/0066555 A1 * | 3/2012 | Ganesh .............. G06F 11/0715 |
| | | 714/49 |
| 2012/0266555 A1 | 10/2012 | Cappelle |
| 2013/0104485 A1 | 5/2013 | Meersseman et al. |
| 2016/0177576 A1 | 6/2016 | Ramachandra |
| 2016/0237695 A1 | 8/2016 | Pervan |
| 2016/0333595 A1 | 11/2016 | Cappelle et al. |
| 2018/0179764 A1 | 6/2018 | Pervan |
| 2019/0136545 A1 | 5/2019 | De Rick et al. |
| 2019/0211569 A1 | 7/2019 | Boo et al. |
| 2020/0217083 A1 | 7/2020 | Pervan |

FOREIGN PATENT DOCUMENTS

| | | |
|---|---|---|
| CN | 101910528 A | 12/2010 |
| CN | 105658883 A | 6/2016 |
| EP | 3128102 A1 | 2/2017 |
| WO | 9747843 A1 | 12/1997 |
| WO | 03089736 A1 | 10/2003 |
| WO | 2004063491 A1 | 7/2004 |
| WO | 2005098163 A1 | 10/2005 |
| WO | 2011061659 A2 | 5/2011 |
| WO | 2011153916 A1 | 12/2011 |
| WO | 2015155312 A1 | 10/2015 |
| WO | 2017187298 A2 | 11/2017 |

OTHER PUBLICATIONS

Belgian Search Report from corresponding BE Application No. BE201805830, May 29, 2019.

* cited by examiner

PANEL AND METHOD FOR MANUFACTURING SUCH A PANEL

BACKGROUND

The present invention relates to a panel and to a method for manufacturing such a panel.

More in particular, the invention relates to a panel which is rectangular and has long and short edges. The panel comprises a coupling part on each edge which makes it possible to couple the panel to another similar panel.

Such panels are known, for example from WO 97/47843. In this case, the coupling part is configured at the one long edge to cooperate with the coupling part at the other long edge of another similar panel. The coupling part at the one short edge is configured to cooperate with the coupling part at the other short edge of another similar panel. The cooperating coupling parts form an interlocking tongue and groove connection, both at the long and at the short edges. This is a tongue and groove connection which does not only produce a vertical, but also a horizontal interlocking between the coupled edges. The vertical interlocking is produced by the cooperation between the tongue and the groove. The horizontal interlocking results from an interlocking lip engaging with a downwardly directed interlocking groove. The panels from WO 97/47843 are usually arranged in rows according to a standard pattern. In this case, the panels are installed with a short edge abutting a short edge and a long edge abutting a long edge.

Similar panels are also known which allow for more advanced laying patterns. In this case, the panels are often installed with a short edge abutting a long edge. This is the case, for example, with herringbone patterns. Such herringbone patterns may be produced using the panels described in WO 03/089736 and WO 2004/063491. However, a general problem is the fact that two different types of these panels are required in order to achieve the herringbone pattern. In this case, the one type of panels is the mirror image of the other type of panels. This not only makes installation of the panels more difficult, as the correct type of panel has to be selected as the next panel to be installed, but it also makes the manufacturing process relatively complicated because two types of panels have to be manufactured.

WO 2011/153916 and WO 2015/155312 try to offer a solution to these problems. They propose to construct the coupling part on each edge of the panel to be similar. This offers the advantage that only one type of panel is required in order to produce herringbone patterns. Every coupling part comprises an interlocking lip which is interrupted repeatedly and an interlocking groove which is present at the location of the interruptions in the interlocking lip. With coupled panels, the interlocking lip of the one panel engages with the interlocking groove of the other panel and vice versa. Thus, both a vertical and a horizontal interlocking are produced between the coupled panels. However, the resulting interlocking is not optimal. This is due to the fact that the cooperation between the interlocking lip and the interlocking groove only occurs over a limited distance along the coupled edges. Thus, undulation of the surface may occur with flexible materials, in which case alternating differences in height occur between two adjoining floor panels, namely where differences in height occur along coupled edges with alternately the one and then the other adjoining panel is situated in a higher position. Furthermore, the coupling parts are not simple to manufacture, because of the discontinuous or variable nature of the coupling parts.

WO 2005/098163 also describes panels which only require one type in order to produce herringbone patterns. In the coupled position, the coupling parts form an interlocking tongue and groove connection on the long edges. The coupling parts on the short edges are of identical design and are configured to cooperate with each of the coupling parts on the long edges. However, the practical examples of the coupling parts on the short edges are relatively complicated or do not produce an adequate interlocking action. Thus, the vertical movement of the short edges is not always limited in the coupled position. This has the adverse effect of creating a risk of differences in height between adjacent panels in the installed position of the respective panels.

SUMMARY

It is an object of the invention to offer a solution for one or several of the problems encountered with prior-art panels.

To this end, the invention relates to panels according to a first independent aspect and to panels according to a second independent aspect. These two independent aspects propose alternative solutions to problems encountered with prior-art panels.

To this end, the invention relates, according to the first independent aspect thereof, to a panel which is rectangular and has long and short edges. On each long edge and on each short edge, the panel comprises a coupling part which allows the panel to be coupled to another similar panel. The coupling part on the one long edge comprises a tongue and a downwardly directed interlocking groove. The coupling parts on the other long edge and on the short edges each comprise a groove and an interlocking lip. The interlocking lip on each of the other long edge and the short edges delimits the respective groove along the bottom and comprises an upwardly directed interlocking element. The tongue is configured to cooperate with the groove on each of the other long edge and the short edges of another similar panel in order to produce a vertical interlocking between the respective edges. The downwardly directed interlocking groove is configured to cooperate with the upwardly directed interlocking element on each of the other long edge and the short edges of another similar panel in order to produce a horizontal interlocking between the respective edges. The panel thus makes it possible to form an interlocking tongue and groove connection between the one long edge of the panel and the other long edge and the short edges of other similar panels. This results in a stable unit of coupled panels. In this case, it should be noted that the expression a horizontal interlocking is understood to mean an interlocking which is active in the horizontal direction or in the direction in the plane of the coupled panels and at right angles to the coupled edges. The expression a vertical interlocking is understood to mean an interlocking which is active in the vertical direction or in the direction at right angles to the plane of the coupled panels.

The interlocking lip on the other long edge is preferably absent along a portion of the other long edge. At the location of the aforementioned portion, the coupling part on the other long edge preferably comprises a downwardly directed interlocking groove. The downwardly directed interlocking groove on the other long edge is preferably configured to cooperate with the upwardly directed interlocking element on the one and/or other short edge of another similar panel in order to produce a horizontal interlocking between the respective edges. Thus, it becomes possible to interlocking the other long edge of the panel with the short edges of other similar panels in a simple and adequate manner. The vertical movement of the short edges may be limited by the interlocking lip thereof engaging under the coupling part with the other long edge. This limits or reduces the risk of the occurrence of differences in height between adjacent panels in the installed position of the respective panels.

The interlocking lip on the one and/or other short edge is preferably absent along a portion of the respective short edge. The coupling part on the respective short edge preferably comprises a downwardly directed interlocking groove at the location of the aforementioned portion. The downwardly directed interlocking groove on the respective short edge is preferably configured to cooperate with the upwardly directed interlocking element on the other long edge of another similar panel in order to produce a horizontal interlocking between the respective edges. Thus, it becomes possible to interlocking the respective short edge of the panel with the other long edge of another similar panel in a simple and adequate manner. The vertical movement of the other long edge may be limited by the interlocking lip thereof engaging under the coupling part with the respective short edge. This limits or reduces the risk of differences in height occurring between adjacent panels in the installed position of the respective panels. A particular situation is produced if the interlocking lip of the respective short edge engages under the coupling part of the other long edge. This also produces a vertical interlocking between the respective coupled edges. The risk of differences in height occurring between adjacent panels in the installed position of the respective panels is thus limited in an optimum manner.

The interlocking lip on each of the short edges is preferably absent along a portion of the short edges. The coupling part on each of the short edges preferably comprises a downwardly directed interlocking groove at the location of the aforementioned portion. The downwardly directed interlocking groove on the one and the other short edge is preferably configured to cooperate with the upwardly directed interlocking element on the other and the one short edge of another similar panel, respectively, in order to produce a horizontal interlocking between the respective edges. This makes it possible to interlocking the short edges of the panel with the short edges of other similar panels in a simple and adequate manner. This enables the panels to also be installed in rows with a short edge abutting a short edge. A vertical interlocking is produced if the interlocking lip of a short edge engages under the coupling part of a short edge coupled thereto and vice versa. The risk of differences in height occurring between adjacent panels in the installed position of the respective panels is then limited in an optimum manner.

The interlocking lip on the one and/or other short edge may be present along the entire or virtually the entire length of the one and/or other short edge, respectively. Such an interlocking lip is simple to manufacture and offers the possibility of providing an interlocking along the entire or virtually the entire short edge or edges.

The coupling part on the one long edge is preferably present along the entire or virtually the entire length of the one long edge. Such a coupling part is simple to manufacture. In addition, an interlocking may be achieved along the entire or virtually the entire length of the one long edge.

The groove on the other long edge is preferably present along the entire or virtually the entire length of the other long edge. This offers the possibility of manufacturing the groove in a simple way and to provide an interlocking along the entire or virtually the entire length of the other long edge.

The groove on the one and/or other short edge is preferably present along the entire or virtually the entire length of the one and/or other short edge, respectively. This offers the possibility of manufacturing the groove in a simple way and to provide an interlocking along the entire or virtually the entire length of the respective short edge or edges.

The coupling part on the one and/or other short edge may comprise a further interlocking element. The coupling part on the other long edge may comprise a further interlocking element. The further interlocking element on the other long edge may be configured to cooperate with the further interlocking element on the one and/or other short edge of another similar panel in order to produce a vertical interlocking between the respective edges. The vertical interlocking which is produced between these edges makes it possible to produce a stable unit of coupled panels. In this case, the risk of differences in height occurring between adjacent panels in the installed position of the respective panels is minimized.

The further interlocking element on the one and/or other short edge may be situated above the respective groove. The further interlocking element may be situated, for example, on a second, top lip which delimits the groove along the top.

The further interlocking element on the one and/or other short edge may be situated on the distal or free end of the respective interlocking lip.

According to a second independent aspect, the invention relates to a panel which is rectangular and has long and short edges, wherein, on each long edge and on each short edge, the panel comprises a coupling part which allows the panel to be coupled to another similar panel, wherein the coupling parts on the one long edge, and on both short edges, comprise a tongue and a downwardly directed interlocking groove; and wherein the coupling part on the other long edge comprises a groove and an interlocking lip. The interlocking lip delimits the respective groove along the bottom and comprises an upwardly directed interlocking element. This interlocking lip preferably does not extend beyond the top edge, or the distal end of the top lip. If such an interlocking lip does protrude, preferably at least a portion of the upright interlocking element is situated vertically under the top lip.

The groove is configured to cooperate with the tongue on each of the one long edge and the short edges of another similar panel in order to produce a vertical interlocking between the respective edges. The downwardly directed interlocking groove of the one long edge and both short edges is configured to cooperate with the upwardly directed interlocking element on the other long edge of another similar panel in order to produce a horizontal interlocking between the respective edges. Thus, the panel makes it possible to form an interlocking tongue-and-groove connection between the other long edge of the panel and the one long edge and the short edges of other similar panels. This results in a stable unit of coupled panels. In this case, it should be noted that a horizontal interlocking is understood to mean an interlocking which is active in the horizontal direction or in the direction in the plane of the coupled panels and at right angles to the coupled edges. A vertical interlocking is understood to mean an interlocking which is active in the vertical direction or in the direction at right angles to the plane of the coupled panels.

The tongue and its interlocking groove on the one long edge are preferably absent along a portion of the respective long edge. At the location of the abovementioned portion, the coupling part on the one long edge preferably comprises a groove with an interlocking lip with an upwardly directed interlocking element. The upwardly directed interlocking element on the one long edge is preferably configured to cooperate with the downwardly directed interlocking groove on the other long edge and/or on the short edges of another similar panel in order to produce a horizontal interlocking between the respective edges. This makes it possible to interlock the other long edge of the panel with the short edges of other similar panels in a simple and adequate manner. The vertical movement of the short edges may be limited by the interlocking lip thereof engaging with the other long edge over the coupling part. The risk of the occurrence of differences in height between adjacent panels in the installed position of the respective panels is thus limited or reduced.

The tongue and the downwardly directed interlocking groove on each of the short edges are preferably absent along a portion of the respective short edge. At the location of the respective abovementioned portion, the coupling part contains a groove and an interlocking lip on each of the short edges. The groove and the interlocking lip on the one and other short edge are configured to cooperate with the tongue and the downwardly directed interlocking groove on the other and one short edge of another similar panel, respectively, in order to produce a horizontal interlocking between the respective edges. This makes it possible for the short edges of the panel to be interlocked with the short edges of other similar panels in a simple and adequate manner. This enables the panels to also be installed in rows with a short edge abutting a short edge. The risk of differences in height occurring between adjacent panels in the installed position of the respective panels is then limited in an optimum manner.

Preferably, the tongue and the downwardly directed interlocking groove on the one and/or other short edge are present along the entire or virtually the entire length of the one and/or the other short edge, respectively. Such an interlocking lip is simple to manufacture and offers the possibility of providing an interlocking along the entire or virtually the entire short edge or edges.

Preferably, the coupling part on the one long edge is present along the entire or virtually the entire length of the one long edge. Such a coupling part is simple to manufacture. In addition, an interlocking may be achieved along the entire or virtually the entire length of the one long edge.

The groove on the other long edge is preferably present along the entire or virtually the entire length of the other long edge. This offers the possibility of manufacturing the groove in a simple way and to provide an interlocking along the entire or virtually the entire length of the other long edge.

The tongue and the downwardly directed interlocking groove on the one and/or other short edge are preferably present along the entire or virtually the entire length of the one and/or other short edge, respectively. This offers the possibility of manufacturing the tongue and the downwardly directed interlocking groove in a simple way and to provide an interlocking along the entire or virtually the entire length of the respective short edge or edges.

Below, preferred characterizing features are described which may be used both in an embodiment according to the first independent aspect and with an embodiment according to the second independent aspect.

The interlocking lip on the other long edge, the one short edge and/or the other short edge preferably surpasses the top edge of the other long edge, the one short edge and/or the other short edge, respectively. This makes installation of the panels easier. In addition, a similar "long" interlocking lip may, if desired, engage relatively far below the coupling part of an edge coupled thereto. This makes the resulting interlocking stronger. In this particular embodiment, the upwardly directed interlocking element is preferably completely or partially in the portion of the interlocking lip which is beyond the top edge. The top edge of the respective edge may be formed by the distal or free end of a second, top lip which delimits the respective groove along the top.

The coupling parts on the long edges are preferably configured in such a way that the one long edge of the panel can be coupled to the other long edge of another similar panel by means of a turning movement. In this case, the interlocking lip on the other long edge may bend to and fro in an elastic manner. In that case, this is referred to as a so-called click-fit coupling. In this case, the interlocking lip may or may not spring back completely to its initial position or rest position.

The coupling parts on the long edges are preferably configured in such a way that the one long edge of the panel can be coupled to the other long edge of another similar panel by means of a substantially horizontal translational movement. When performing this translational movement, the interlocking lip on the other long edge may bend to and fro in an elastic manner. In this case, the interlocking lip may or may not spring back completely to its initial position or rest position.

The coupling parts on the long edges are preferably designed in such a way that they allow both a turning movement and a substantially horizontal translational movement as a coupling movement.

The coupling part on the one and/or other short edge and the coupling part on the one long edge are preferably configured in such a way that the one and/or other short edge of the panel can be coupled to the one long edge of another similar panel by means of a substantially horizontal translational movement. When performing this translational movement, the interlocking lip on the one and/or other short edge may bend to and fro in an elastic manner. In this case, the interlocking lip may or may not spring back completely to its initial position or rest position.

The coupling part on the one and/or other short edge and the coupling part on the other long edge are preferably configured in such a way that the one and/or other short edge of the panel can be coupled to the other long edge of another similar panel by means of a substantially horizontal translational movement. When performing this translational movement, the interlocking lip on the one and/or other short edge and/or the interlocking lip on the other long edge may bend to and fro in an elastic manner. In this case, the respective interlocking lip may or may not spring back completely to its initial position or rest position.

The coupling parts on the short edges are preferably configured in such a way that the one short edge of the panel can be coupled to the other short edge of another similar panel by means of a substantially horizontal translational movement. When performing this translational movement, the interlocking lip on the one and/or other short edge elastic may bend to and fro in an elastic manner. In this case, the respective interlocking lip may or may not spring back completely to its initial position or rest position.

The coupling part on the one and/or other long edge is preferably formed as a single part with the actual panel and is made of the same material. The coupling part on the one and/or other long edge may or may not be formed entirely as a single part with the actual panel and may or may not be made of the same material. The coupling part on the one and/or other long edge may be made of a different material to that of the actual panel. The coupling part on the one and/or other long edge may, for example, be manufactured separately and subsequently be attached to the actual panel. The separate manufacture may be effected, for example, by means of extrusion. The attachment to the actual panel may be obtained, for example, by means of glue.

According to a particular embodiment, the abovementioned interlocking lip, if desired together with the upwardly directed interlocking element, may be formed by a separate strip which is attached to the respective edge, for example mechanically. Such a strip may be made of plastic or may be formed from a wood-based material, for example from MDF or HDF. In this case, it is possible to produce the profiling of the panel material on the respective edge with a substantially constant cross section, for example with at least one groove, but without an interlocking lip, while providing the abovementioned interlocking lip locally, preferably approximately centrally along the respective edge, for example by attaching it mechanically on the abovementioned substantially constant cross section. The substantially constant cross section is preferably able to cooperate with the coupling parts of both short edges and remains accessible, i.e. without the interlocking lip attached, near both ends of the respective long edge along a length which is at least half the width, or at least the width, of a short edge. In this way, the short edges can be coupled to these ends. Such a configuration of the long edge with the groove is preferred, even if the interlocking lip forms an integral part with the panel material, as will become clear below from the detailed description.

The coupling part on the one and/or other short edge is preferably formed as a single part with the actual panel and is made of the same material. The coupling part on the one and/or other short edge may or may not be formed entirely as a single part with the actual panel and may or may not be made of the same material. The coupling part on the one and/or other short edge may be made of a different material to that of the actual panel. The coupling part on the one and/or other short edge may, for example, be manufactured separately and subsequently be attached to the actual panel. The separate manufacture may be effected, for example, by means of extrusion. The attachment to the actual panel may be obtained, for example, by means of glue.

The panel is preferably configured in such a way that a herringbone pattern can be produced using several such panels.

The panel is preferably configured in such a way that a herringbone pattern can be produced using several such panels, without requiring the use of panels of another, different type.

The panel is preferably a decorative panel. A decorative panel is provided with a decor on its side which is visible in the installed position. The decor may be any kind of decor, such as a wood or stone decor.

The panel preferably comprises a substrate and a top layer which is connected to the substrate. Connecting the top layer to the substrate may be effected by means of any known laminating or connecting technique. The top layer may be connected to the substrate by means of thermal lamination. The top layer may, for example, be fused together with the substrate. The top layer may be connected to the substrate by means of pressure and/or heat. The top layer may be connected to substrate by means of a bonding means, such as glue or the like.

The top layer is preferably decorative. This means that the top layer has a decor on its side which faces away from the substrate. The decor may be any kind of decor, such as a wood or stone decor.

The top layer may comprise a wooden layer. The wooden layer may, for example, be a wood veneer layer. The wooden layer may be finished with a lacquer or varnish layer.

The top layer may comprise a printed decor and a wear layer in order to protect the printed decor.

The printed decor may be provided on a carrier. The carrier may comprise a paper sheet. The paper sheet may be impregnated by means of a resin. The resin is, for example, melamine resin. The carrier may comprise a plastic film. The plastic film may comprise a thermoplastic. The thermoplastic may comprise vinyl, such as for example polyvinyl chloride or PVC. The wear layer may comprise a paper sheet. The paper sheet may be impregnated by means of a resin. The resin is for example melamine resin. The wear layer may comprise hard or wear-resistant particles, such as corundum particles. The wear layer may comprise a plastic film. The plastic film may comprise a thermoplastic. The thermoplastic may comprise vinyl, such as for example polyvinyl chloride or PVC. The wear layer may comprise a lacquer layer. The lacquer layer may comprise urethane or a UV-based lacquer.

The top layer may comprise a printed decor which is applied directly to the substrate. This is also referred to as a direct print. In this case, the decor is not printed onto a carrier first before being applied to the substrate. It is not excluded for the directly printed decor to be applied to a primer which is present on the substrate. The directly printed decor is preferably a digitally directly printed decor and is thus applied by means of a digital printer, such as a single-pass or multi-pass inkjet printer.

The substrate may comprise wood. The substrate may for example comprise several wooden slats which are connected to each other. This is typically the case with engineered wood. However, the substrate may also be formed as a single part made of wood, for example made of solid wood.

The substrate may comprise wood particles and a binder for mutually binding the wood particles. The wood particles may be wood fibers and/or wood chips. The binder may be a glue or resin, such as for example a melamine, formaldehyde or isocyanate resin. The substrate comprises, for example, a wood fiberboard, such as Medium Density Fiberboard (MDF) or High-Density Fiberboard (HDF), or a chipboard.

The substrate may comprise a thermoplastic material. The thermoplastic material comprises a thermoplastic. The thermoplastic may be polyvinyl chloride (PVC), polyethylene (PE), polypropylene (PP), polyurethane (PU) or polyethylene terephthalate (PET). The thermoplastic material may comprise polyvinyl chloride with or without plasticizers. The thermoplastic material may comprise polyvinyl chloride containing an amount of plasticizer of at most 5 phr. The thermoplastic material may comprise polyvinyl chloride containing an amount of plasticizer of at least 12 phr or at least 20 phr. In this case, phr means "parts per hundred resin". The thermoplastic material may or may not be foamed. The thermoplastic material may comprise closed-cell or open-cell foam. The thermoplastic material may comprise a filler. The filler may be an organic filler, such as wood particles. The filler may be an inorganic filler. The filler may be a mineral filler, such as calcium carbonate, for example chalk or limestone. The filler may be talc.

The substrate may comprise a thermosetting material. The thermosetting material comprises a thermosetting plastic. The thermosetting plastic may be polyurethane (PU). The thermosetting material may comprise a filler. The filler may be an organic filler, such as wood particles. The filler may be an inorganic filler. The filler may be a mineral filler, such as calcium carbonate, for example chalk or limestone. The filler may be talc.

The substrate may comprise any desired other material, such as a cement fiber panel or a magnesium panel.

The panel may be formed as a single part. The panel may, for example, be formed as a single part made of wood. This is the case, for example, with solid parquet.

The panel may be a floor, wall or ceiling panel. Other types of panels are not excluded.

The invention also relates, according to the third independent aspect thereof, to a method for manufacturing a panel according to the first or second independent aspect of the invention. The method comprises at least the following steps:

advancing the panel relative to cutting or milling tools; and treating the edges of the advancing panel by means of the cutting or milling tools in order to form at least some of the coupling parts.

Forming coupling parts by means of cutting or milling operations is efficient and produces an accurate result. The cutting or milling tools are preferably rotating cutting or milling tools.

Preferably, at least one of the cutting or milling tools is moved towards or away from the panel. This makes it possible for this cutting or milling tool to only treat a part of the respective edge. This is advantageous if a coupling part has to be formed which varies along the respective edge. An example of such a coupling part is a coupling part from which the interlocking lip is absent along a portion of the respective edge and which, at least there, comprises a downwardly directed interlocking groove. Such a coupling part is described in this text and may be situated on the other long edge and/or the short edges.

The moving cutting or milling tool may comprise a so-called jumper.

The moving cutting or milling tool may be used to form a coupling part from which the interlocking lip is absent along a portion of the respective edge and which, at least there, comprises a downwardly directed interlocking groove. The moving cutting or milling tool may, for example, be used to remove the interlocking lip along the aforementioned portion. Thus, the interlocking lip may be first formed, for example, using one or several stationary cutting or milling tools. A stationary cutting or milling tool is a cutting or milling tool which has a fixed position and is thus not moved towards or away from the panel. In this case, it is possible for the cutting or milling tool to rotate or perform a local movement. After the treatment or treatments using the one or several stationary cutting or milling tools, the interlocking lip may be present along the entire or virtually the entire respective edge. The moving cutting or milling tool can then be used to remove the interlocking lip along the aforementioned portion. The moving cutting or milling tool may also be used to form the downwardly directed interlocking groove. Alternatively, one or several stationary cutting or milling tools may be used to form the downwardly directed interlocking groove. In this alternative embodiment, the downwardly directed interlocking groove may be present along the entire or virtually the entire respective edge.

Moving cutting or milling tools may be used on the long edges and/or the short edges. Preferably, one or several moving cutting or milling tools are used on the edges where a varying coupling part is present or has to be manufactured.

Preferably, the tongue and the downwardly directed interlocking groove on the one long edge are formed by means of stationary cutting or milling tools. This efficiently ensures that these elements are present along the entire or virtually the entire one long edge.

Preferably, the groove on the other long edge is formed by means of one or several stationary cutting or milling tools. This efficiently ensures that this element is present along the entire or virtually the entire other long edge.

Preferably, the groove on the one and/or other short edge is formed by means of one or several stationary cutting or milling tools. This efficiently ensures that this element is present along the entire or virtually the entire one and/or other short edge.

The interlocking lips are preferably formed by means of one or several stationary cutting or milling tools. The interlocking lips may or may not be finished by means of another tool. An example of such another tool is a moving cutting or milling tool.

BRIEF DESCRIPTION OF THE DRAWINGS

In order to show the features of the invention in more detail, some preferred embodiments are described below by way of example and without being limited thereto, with reference to the accompanying drawings, in which.

DETAILED DESCRIPTION OF VARIOUS EMBODIMENTS

Figure 1:
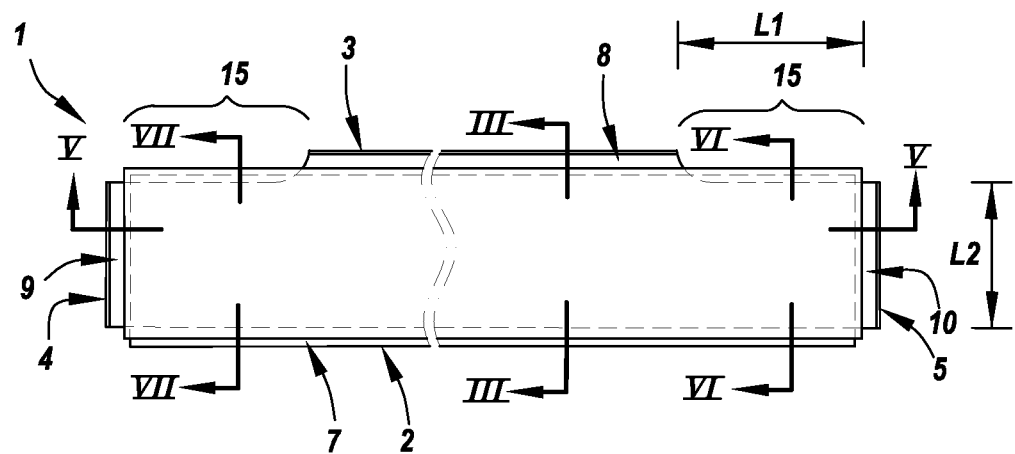
FIG. 1 shows a top view of a panel according to the first independent aspect of the invention.

FIG. 1 shows a panel 1 according to the invention. The panel 1 is a floor panel. The panel 1 is suitable for forming a floor covering. The panel 1 is of the decorative type. Indeed, the decor has not been shown in FIG. 1. The decor may, for example, be a wood or stone decor. The panel 1 is rectangular and has a pair of long edges 2-3 and a pair of short edges 4-5. On each long edge 2-3 and on each short edge 4-5, the panel 1 comprises a coupling part which makes it possible to couple the panel 1 to another similar panel. The coupling parts on the edges 2-3-4-5 are denoted by the reference numerals 7-8-9-10, respectively. The exact embodiment of the coupling parts 7-10 will be explained in more detail by means of the following FIGS. 3 to 9.

Figure 2:
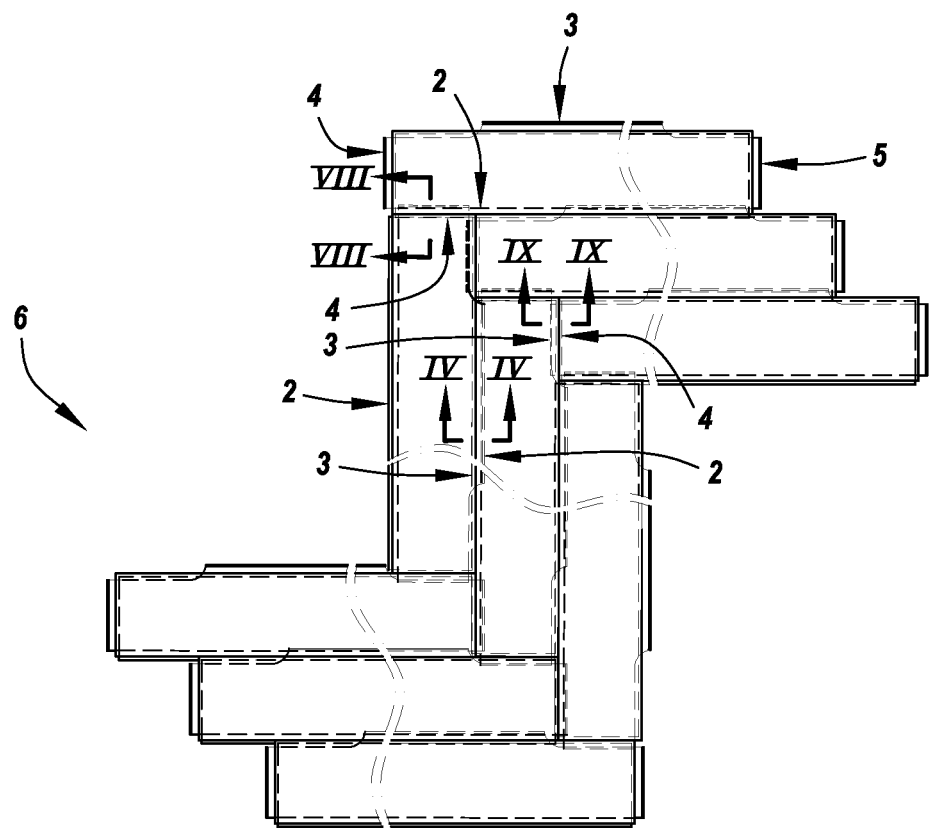
FIG. 2 shows a herringbone pattern which is composed of panels from FIG. 1.

FIG. 2 shows a herringbone pattern 6 which has been produced using panels which are designed like the panel 1 from FIG. 1. The herringbone pattern 6 is thus composed of only one type of panels.

Figure 3:
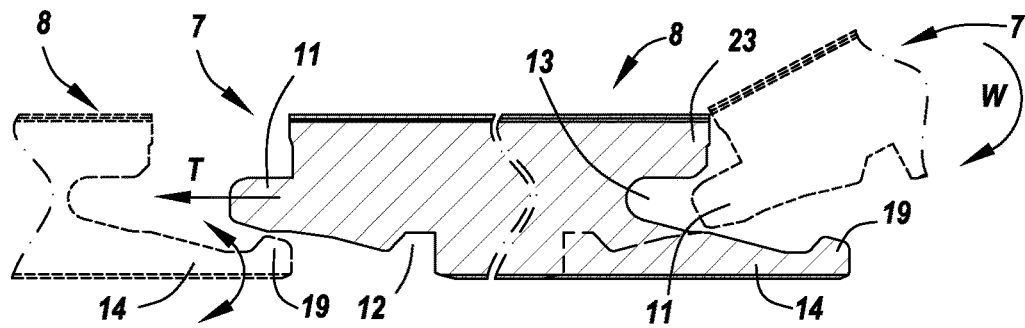
FIG. 3 shows a cross section along the intersecting line III-III in FIG. 1.

FIG. 3 shows a cross section along the line III-III from FIG. 1 and in this case shows a view of the coupling parts 7-8 on the long edges 2-3. The coupling part 7 on the one long edge 2 comprises a tongue 11 and a downwardly directed interlocking groove 12. The interlocking groove 12 is situated on the bottom side of the coupling part 7. The coupling part 8 on the other long edge 3 comprises a groove 13 and an interlocking lip 14. The groove 13 is delimited along the top by a top lip 23 and delimited along the bottom by the interlocking lip 14. The free or distal end of the top lip 23 forms the top edge of the other long edge 3. The interlocking lip 14 surpasses the top edge of the other long edge 3 or the free or distal end of the top lip 23. The interlocking lip 14 comprises an upwardly directed interlocking element 19. The upwardly directed interlocking element 19 is provided on the top side of the interlocking lip 14. The upwardly directed interlocking element 19 is situated entirely in the portion of the interlocking lip 14 which is located beyond the top edge or beyond the free or distal end of the top lip 23.

FIG. 3 shows, on the right-hand side and by means of a dotted line, that the coupling part 7 of the one long edge 2 can be inserted in the coupling part 8 of the other long edge 3 by means of a turning movement W. In this case, a click-fit or snap-fit effect may or may not occur.

FIG. 3 shows, on the left-hand side and by means of a dotted line, that the coupling part 7 of the one long edge 2 can also be inserted in the coupling part 8 of the other long edge 3 by means of a substantially horizontal translational movement T. When performing the translational movement T, the interlocking lip 14 may bend to and fro in an elastic manner, as is indicated by an arrow. This is referred to as a click-fit or snap-fit coupling.

Figure 4:
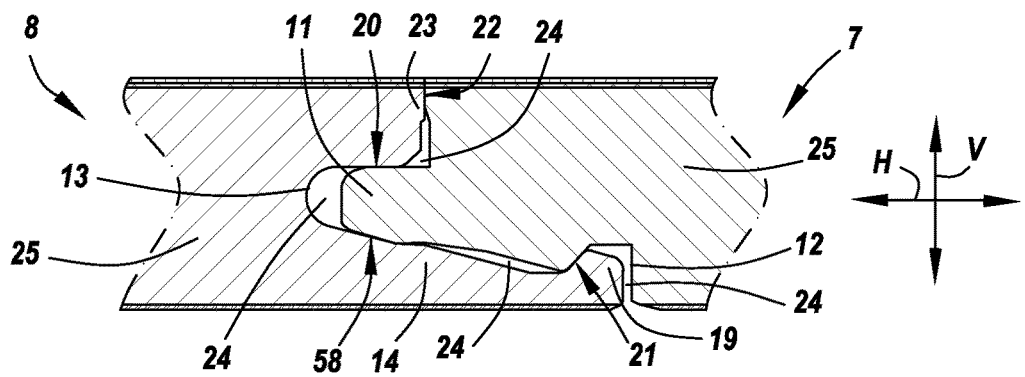
FIG. 4 shows a cross section along the intersecting line IV-IV in FIG. 2.

FIG. 4 shows a cross section along line IV-IV in FIG. 2 and thus indicates how the coupling parts 7-8 on the coupled long edges 2-3 cooperate.

The tongue 11 on the one long edge 2 cooperates with the groove 13 on the other long edge 3. In this case, a vertical interlocking or an interlocking in the direction V is produced between the coupled edges 2-3. More particularly, the top side of the tongue 11 cooperates with the bottom side of the top lip 23. In that location, interlocking surfaces 20 are thus formed which in this case are oriented horizontally. However, it is also possible for the interlocking surfaces 20 to have an inclined orientation. The interlocking surfaces 20 may, for example, have a downward inclination in the direction of the tip of the tongue 11. Here, in particular, a supporting point or supporting surface 58 is also formed between the bottom side of the tongue 11 and the top side of the bottom lip 14. Furthermore, one or several spaces or air chambers 24 are formed between the coupled edges 2-3 of the panels 1.

The downwardly directed interlocking groove 12 on the one long edge 2 cooperates with the upwardly directed interlocking element 19 on the other long edge 3. In this case, a horizontal interlocking or an interlocking in the direction H is produced between the coupled edges 4-5. The interlocking groove 12 and the interlocking element 19 cooperate by means of interlocking surfaces 21. The interlocking surfaces 21 are in this case oriented at an angle and define an angle different from zero with the horizontal.

The interlocking lip 14 may be elastically bent in a coupled position. As a result thereof, a force can be generated which pushes the coupled edges 2-3 towards each other at the top sides of the coupled panels 1. For example, the contact surfaces 22 may be pushed towards each other by such a retroactive or rebound force. More specifically, the interlocking lip 14 may be bent downwards in an elastic manner. Indeed, this is not illustrated in FIG. 4.

The coupling parts 7-8 on the long edges 2-3 are formed as a single part with the actual panel 1 and made of the same material. More specifically, the coupling parts 7-8 are in this case made of the material of the substrate 25 of the panel 1.

Figure 5:
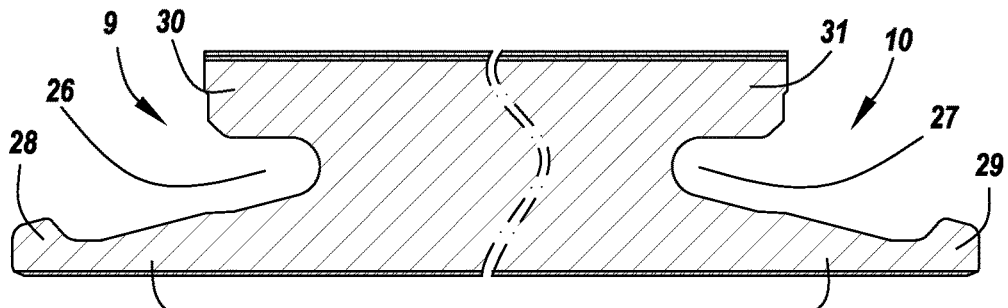
FIGS. 5 to 7 show cross sections along the intersecting lines V-V, VI-VI and VII-VII in FIG. 1, respectively.

FIG. 5 shows the coupling parts 9-10 on the short edges 4-5 of the panel 1. The coupling parts 9-10 are of a similar design to the coupling part 8 on the other long edge 3, as is shown in FIGS. 3 and 4. They allow the short edges 2-3 to be coupled to the one long edge 2 by means of a substantially horizontal translational movement T, as is illustrated in FIG. 3. The coupling parts 9-10 are of a similar design. The coupling parts 9-10 each comprise a groove 26-27 and an interlocking lip 17-18. Each groove 26-27 is delimited along the top by a top lip 30-31 and along the bottom by the interlocking lip 17-18. The free or distal end of the top lips 30-31 forms the top edges of the respectively short edges 2-3. The interlocking lips 17-18 surpass the top edge of the respective short edges 2-3 or the free or distal end of the top lips 30-31. The interlocking lips 17-18 each comprise an upwardly directed interlocking element 28-29. The upwardly directed interlocking elements 28-29 are provided on the top side of the respective interlocking lips 17-18. The upwardly directed interlocking elements 28-29 are situated entirely in the portion of the respective interlocking lips 17-18 which is beyond the top edges or beyond the free or distal end of the top lips 30-31.

Figure 6:
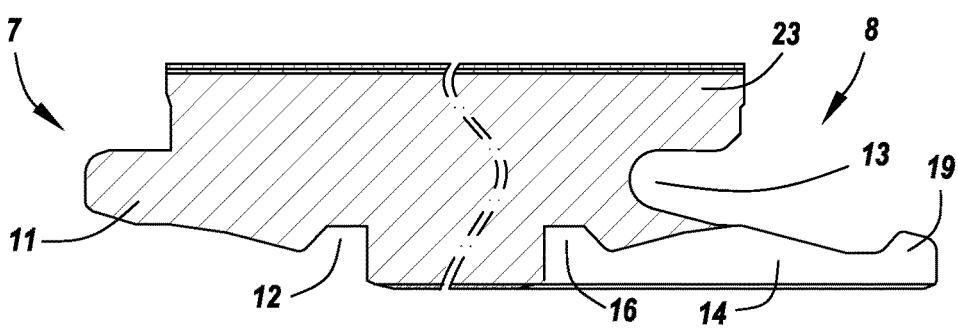
Figure 7:
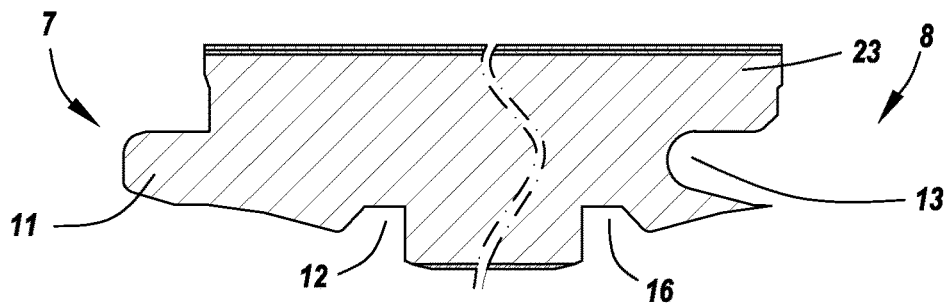

FIG. 1 also shows that the coupling part 7 is present along the entire or virtually the entire length of the long edge 2. The coupling parts 9-10 are likewise present along the entire or virtually the entire length of the respectively short edges 4-5. FIG. 1 furthermore shows that the interlocking lip 14 is absent along one or several portions 15 of the other long edge 3. FIGS. 6 and 7 show the design of the coupling part 8 at the position of the portions 15. At that location, the coupling part 8 comprises the groove 13 and a downwardly directed interlocking groove 16. The groove 13 is present along the entire or virtually the entire length of the long edge 3.

Figure 8:
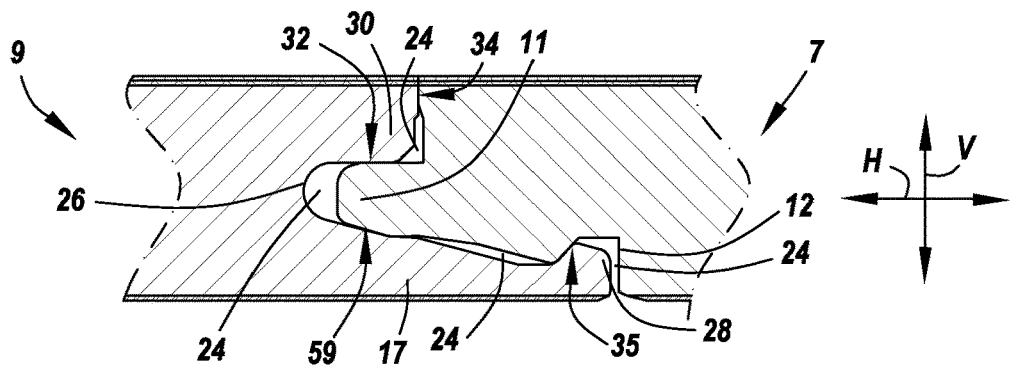
FIGS. 8 and 9 show cross sections along the intersecting lines VIII-VIII and IX-IX in FIG. 2, respectively.

FIG. 8 shows a cross section along the line VIII-VIII from FIG. 2 and thus the cooperation between the coupling part 7 on the long edge 2 and the coupling part 9 on the short edge 4. The cooperation between these coupling parts 7 and 9 is similar to this between the coupling parts 7 and 8. After all, the respective coupling parts are of similar design. The cooperation between the coupling parts 7 and 10 is also similar.

Figure 9:
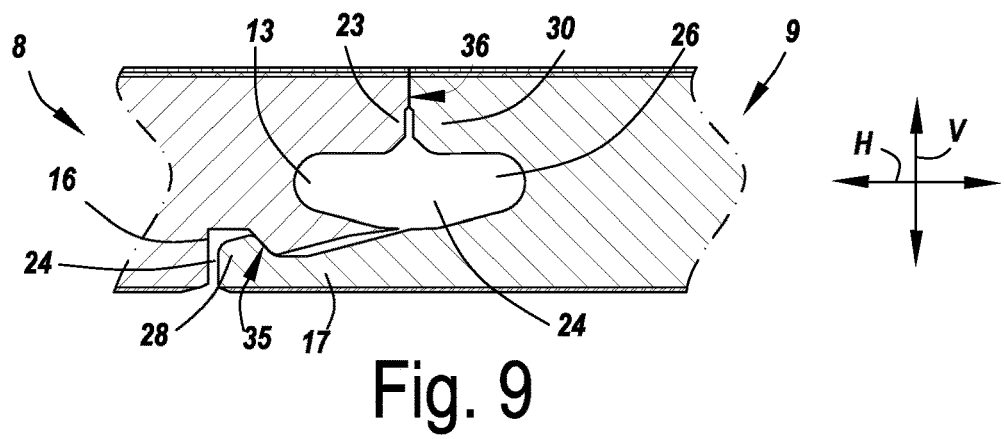

FIG. 9 shows a cross section along the line IX-IX from FIG. 2 and thus the cooperation between the coupling part 8 of the long edge 3 and the coupling part 9 of the short edge 4. The upwardly directed interlocking element 28 cooperates with the downwardly directed interlocking groove 16. In this case, a horizontal interlocking or an interlocking in the horizontal direction H is produced. More specifically, the horizontal interlocking is produced by means of interlocking surfaces 35. Here, the interlocking faces 35 are in particular oriented at an angle. The interlocking lip 17 may be bent in an elastic manner in the coupled position. As a result thereof, a force can be generated which pushes the coupled edges 3 and 4 towards each other. The contact faces 36 may thus be pushed, for example, towards each other. The vertical movement of the short edge 4 is limited by the fact that the interlocking lip 17 engages with the long edge 3 under the coupling part 8. The coupled position from FIG. 9 may be achieved by joining the coupling parts 8 and 9 together by means of a substantially horizontal translational movement. In this case, the interlocking lip 17 may bend to and fro in an elastic manner. The cooperation between the coupling parts 8 and 10 is similar.

Figure 10:
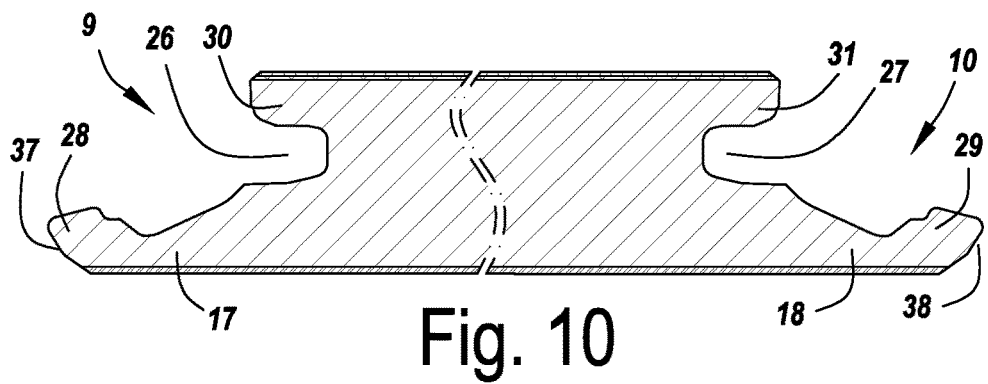
FIGS. 10 to 12 show a variant according to a view similar to that of FIGS. 5, 7 and 9, respectively.
Figure 11:
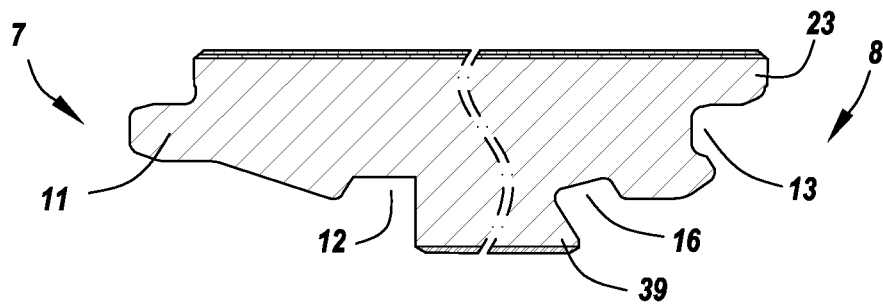
Figure 12:
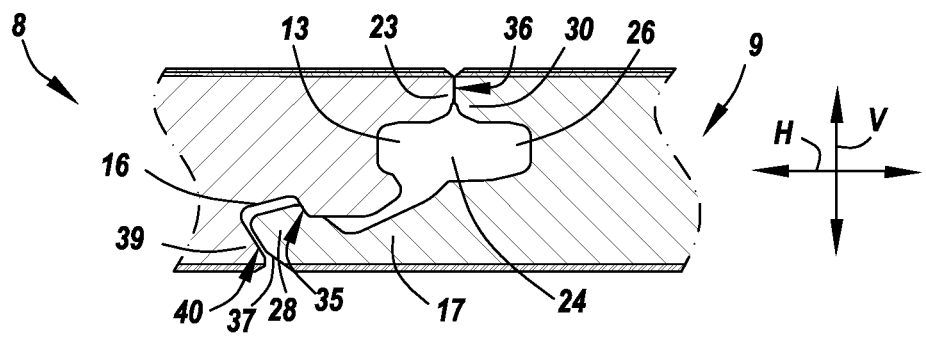

FIGS. 10 to 12 show a panel which has a similar configuration to that of the panel from FIG. 1. Indeed, the coupling parts are designed differently. FIG. 10 shows the coupling parts 9-10 on the short edges 4-5. The coupling parts 9-10 comprise further interlocking elements 37-38 on the distal or free ends of the interlocking lips 17-18 in order to produce a vertical interlocking. FIG. 11 shows the coupling parts 7-8 on the long edges 2-3. The coupling part 8 comprises a further interlocking element 39 in order to produce a vertical interlocking. FIG. 12 shows the cooperation between the coupling parts 8 and 9. The further interlocking elements 37 and 39 cooperate and in particular by means of interlocking surfaces 40. In this case, they produce a vertical interlocking or an interlocking in the vertical direction V. The cooperation between the coupling parts 8 and 10 is similar.

Figure 13:
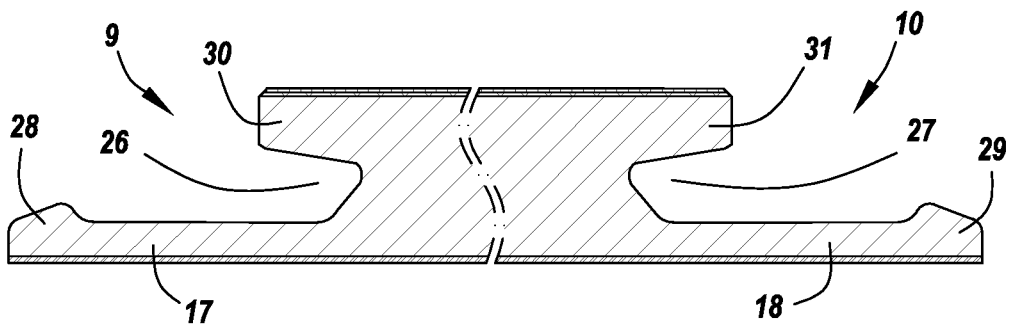
FIGS. 13 to 15 show yet another variant according to a view similar to FIGS. 5, 7 and 9, respectively.
Figure 14:
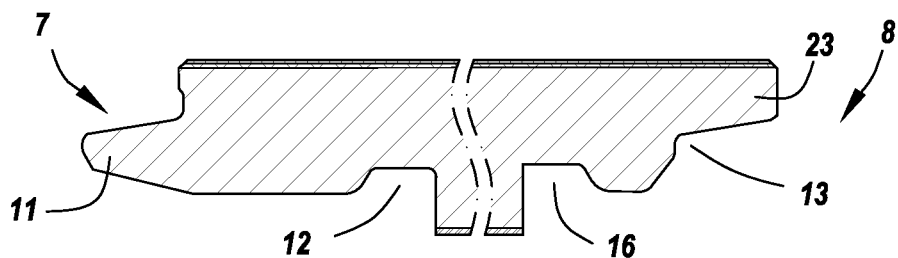
Figure 15:
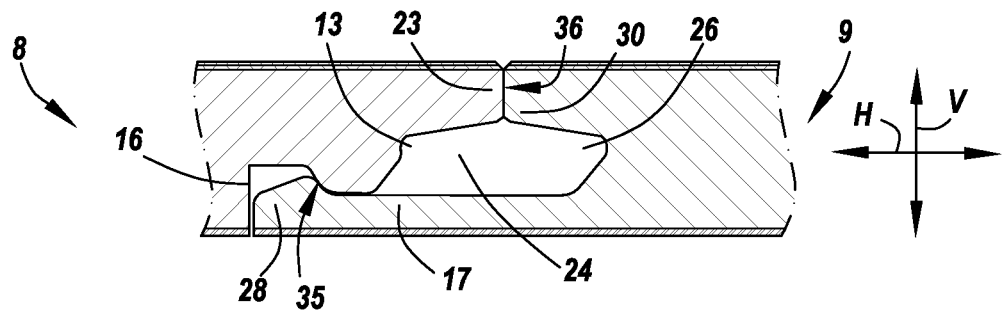

FIGS. 13 to 15 show a panel which has a similar configuration to that of the panel from FIG. 1. Indeed, the coupling parts are designed differently, as is illustrated in FIGS. 13 to 15.

Figure 16:
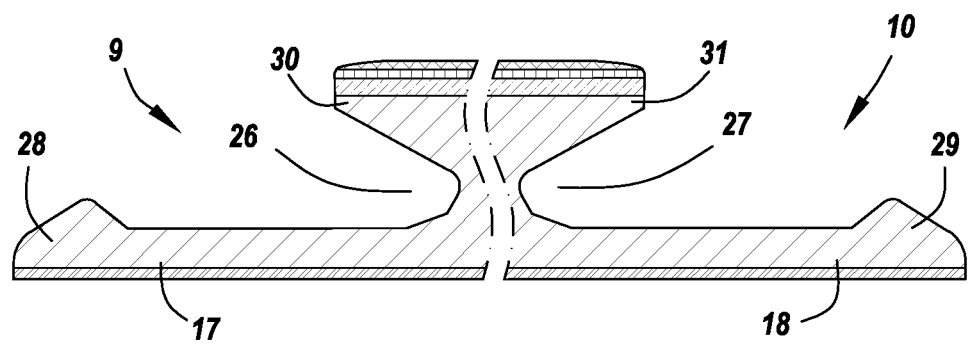
FIGS. 16 to 18 show a further variant according to a view similar to FIGS. 5, 7 and 9, respectively.
Figure 17:
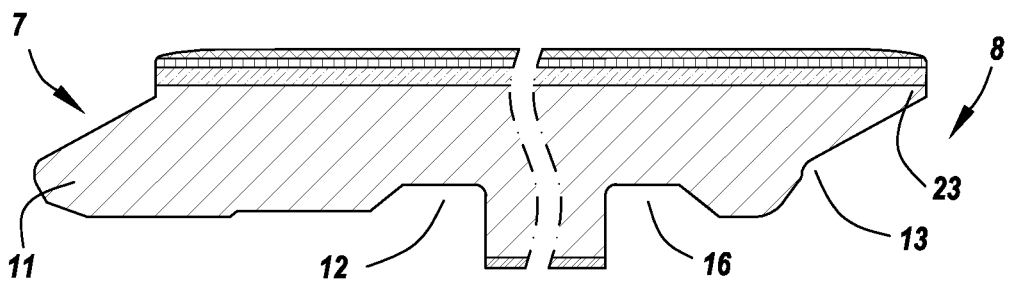
Figure 18:
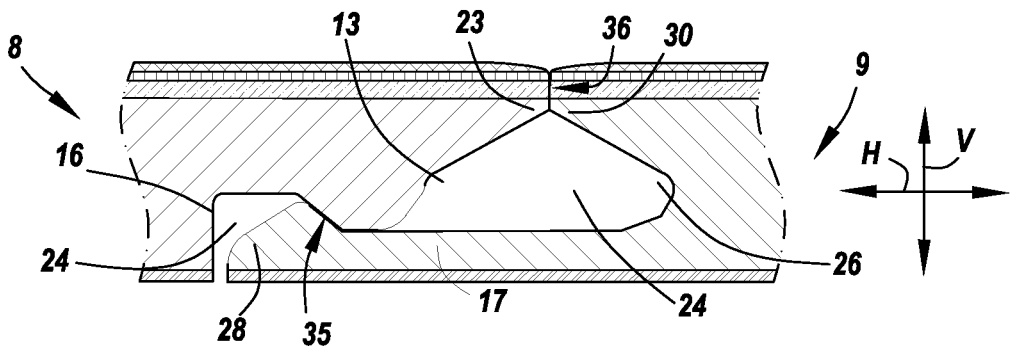

FIGS. 16 to 18 show a panel which has a similar configuration to that of the panel from FIG. 1. Indeed, the coupling parts are designed differently, as is illustrated in FIGS. 16 to 18.

Figure 19:
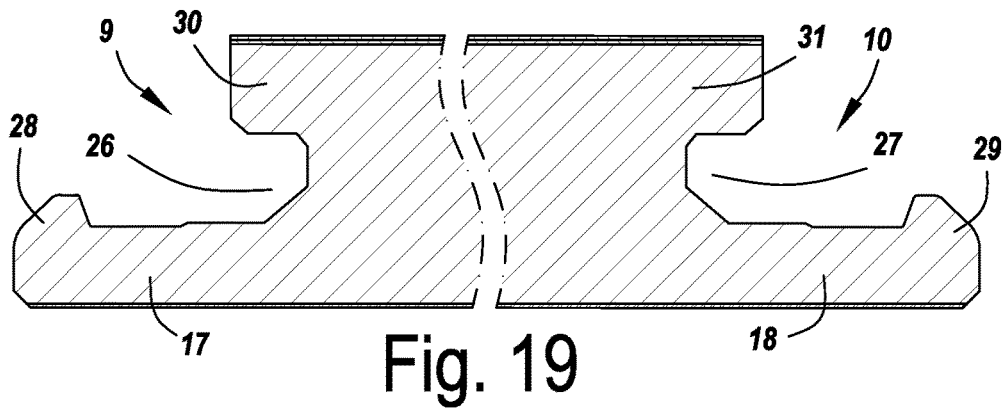
FIGS. 19 to 21 show yet a further variant according to a view similar to FIGS. 5, 7 and 9, respectively.
Figure 20:
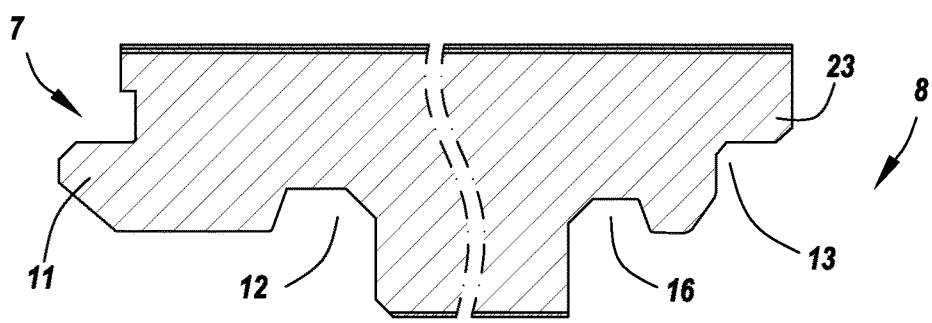
Figure 21:
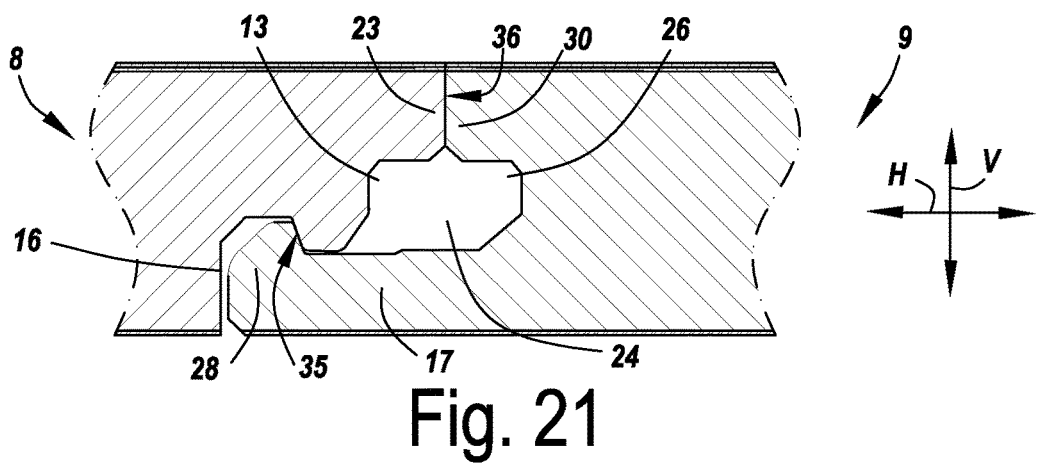

FIGS. 19 to 21 show a panel which has a similar configuration to that of the panel from FIG. 1. Indeed, the coupling parts are designed differently, as is illustrated in FIGS. 19 to 21.

Figure 22:
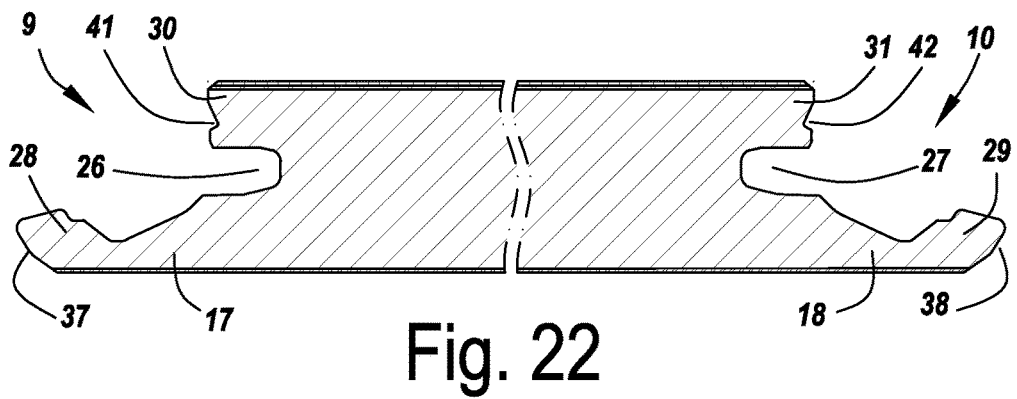
FIGS. 22 to 24 show yet another variant according to a view similar to FIGS. 5, 7 and 9, respectively.
Figure 23:
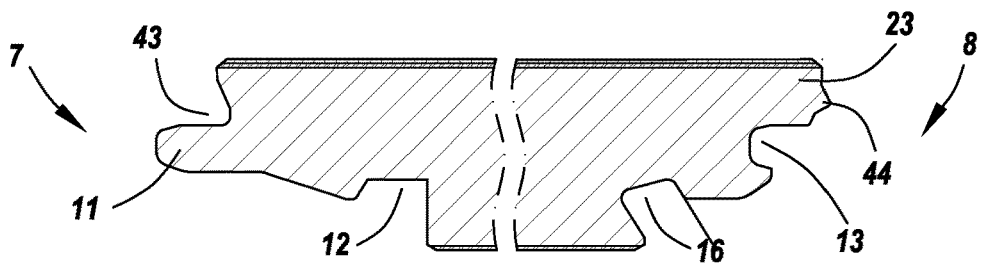
Figure 24:
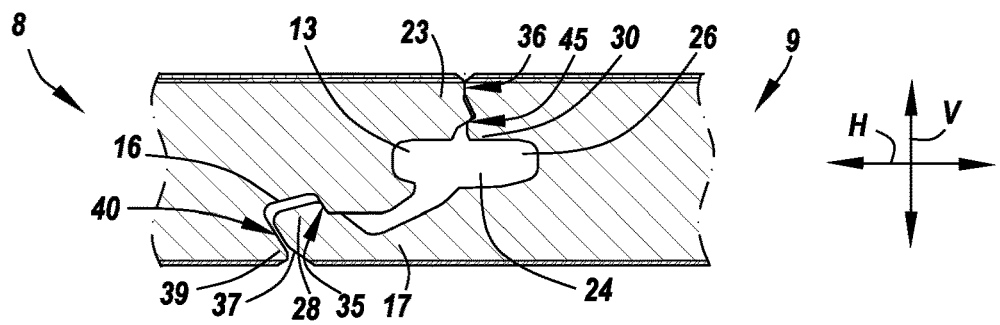

FIGS. 22 to 24 show a panel which has a similar configuration to that of the panel from FIG. 1. Indeed, the coupling parts are designed differently. FIG. 22 shows the coupling parts 9-10 on the short edges 4-5. The coupling parts 9-10 comprise further interlocking elements 41-42 on the distal or free ends of the top lips 30-31 in order to produce a vertical interlocking. Here, the further interlocking elements 41-42 are in particular designed as recesses. FIG. 23 shows the coupling parts 7-8 on the long edges 2-3. The coupling part 8 comprises a further interlocking element 44 in order to produce a vertical interlocking. Here, the further interlocking element 44 is in particular designed as a projection. The coupling part 7 comprises a recess 43 which can accommodate the projection 44 in the coupled position of the edges 2 and 3. FIG. 24 shows the cooperation between the coupling parts 8 and 9. The further interlocking elements 41 and 44 cooperate. In this case, they produce a vertical interlocking or an interlocking in the vertical direction V. The further interlocking elements 41 and 44 cooperate in particular by means of the interlocking surfaces 45. The cooperation between the coupling parts 8 and 10 is similar.

Figure 25:
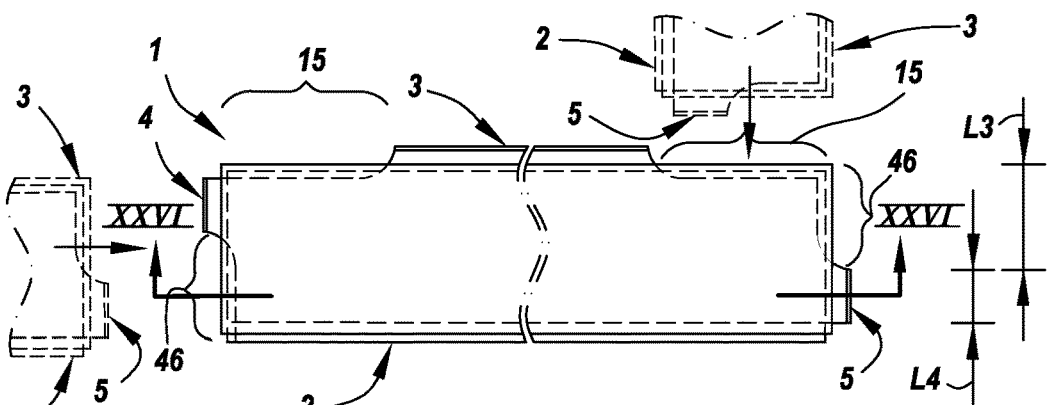
FIG. 25 shows a variant according to a view similar to that of FIG. 1.

FIG. 25 shows a variant of the panel 1 from FIG. 1. What is special about this variant is the fact that the short edges 4-5 can be coupled to one another, as is shown by means of the dashed line. These panels 1 can thus also be installed with a long edge abutting a long edge and a short edge abutting a short edge. To this end, the interlocking lips 17-18 are absent along one or several portions 46 of the short edges 4-5. Along the one or several portions 46, the coupling parts 9-10 comprise a downwardly directed interlocking groove 47-48. The dashed line indicates that the short edge 5 can be coupled to the other long edge 3. The short edge 4 can likewise be coupled to the other long edge 3.

Figure 26:
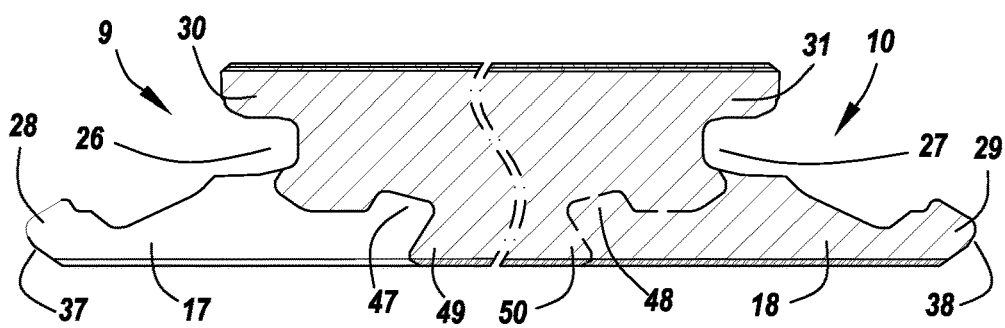
FIG. 26 shows a cross section along the intersecting line XXVI-XXVI in FIG. 25.

FIG. 26 shows a cross section along the line XXVI-XXVI from FIG. 25 and thus shows the coupling parts 9-10 on the short edges 4-5. The form of the coupling parts 9-10 is similar to that from FIGS. 10 and 11. Further interlocking elements 37-38 and 49-50 are present in order to produce a vertical interlocking.

Figure 27:
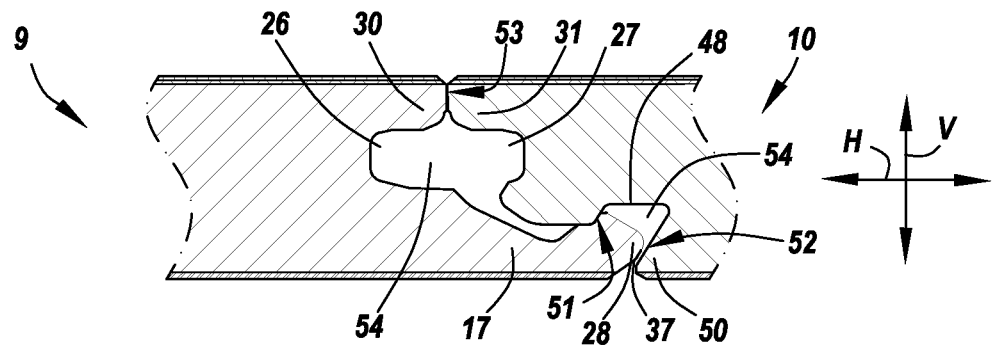
FIG. 27 shows the coupling parts from FIG. 26 in a coupled position.

FIG. 27 shows how the coupling parts 9 and 10 cooperate. The interlocking lip 27 grips under the coupling part 10. The upwardly directed interlocking element 28 cooperates with the downwardly directed interlocking groove 48. In this case, a horizontal interlocking is produced. The elements 28 and 48 cooperate by means of the interlocking surfaces 51. The elements 37 and 50 produce a vertical interlocking. They cooperate by means of the interlocking surfaces 52. Spaces or air chambers are also formed, which are denoted by the reference numeral 54.

Figure 28:
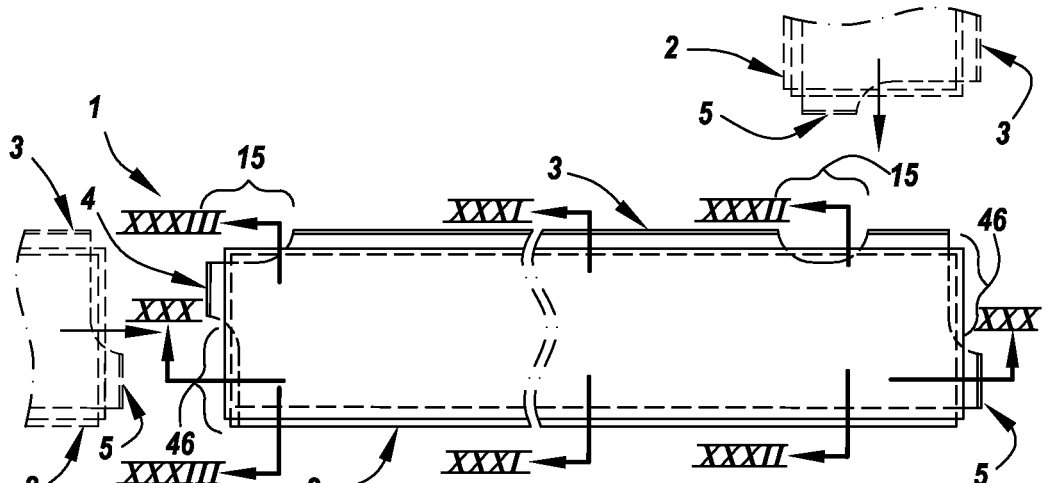
FIGS. 28 and 29 show variants according to a view similar to that of FIG. 1.

FIG. 28 shows a further variant of the panel 1 from FIGS. 1 and 25. What is special about this variant is the fact that both a vertical and a horizontal interlocking can be produced between the coupled edges 5 and 3 as a result of the cooperation between the interlocking lips and the interlocking grooves. An analogous interlocking may be produced between the edges 4 and 3.

Figure 29:
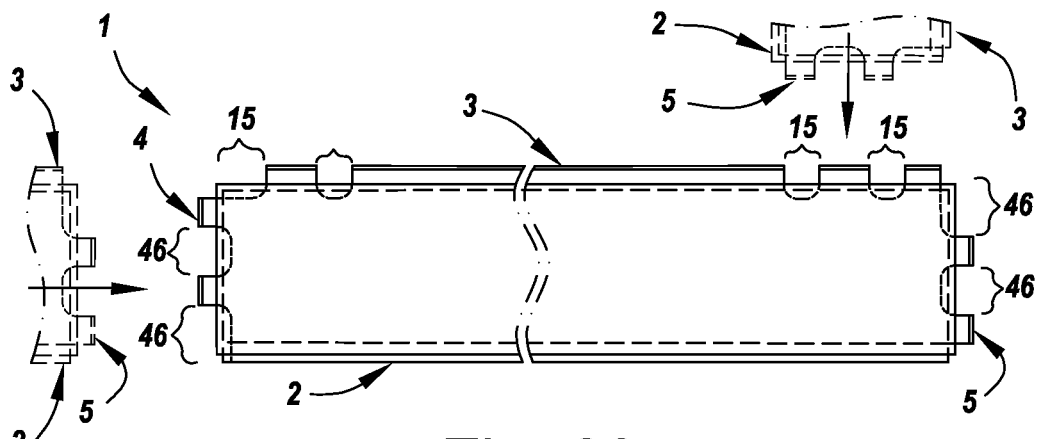

FIG. 29 shows a variant of the panel 1 from FIG. 28. The interlocking lips are absent along several portions 15 and 46 of the respective edges 3 and 4-5 and the respective coupling part comprises a downwardly directed interlocking groove in said locations. Thus, an optimum interlocking is produced between the coupled panels in the coupled position.

Figure 30:
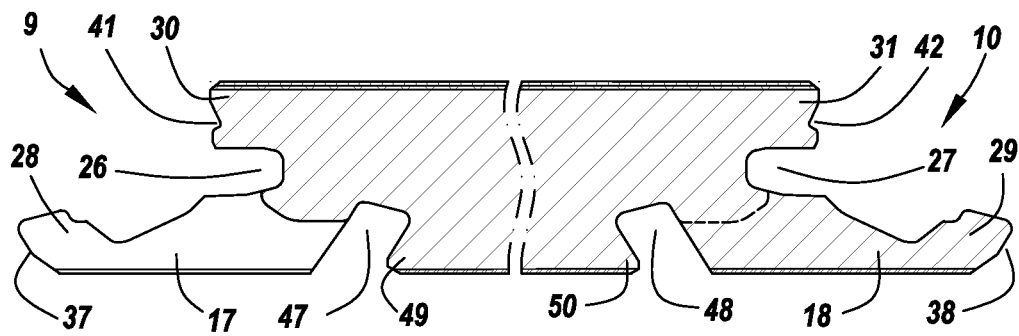
FIGS. 30 to 33 show cross sections along the intersecting lines XXX-XXX, XXXI-XXXI, XXXII-XXXII and XXXIII-XXXIII in FIG. 28.

FIG. 30 shows the coupling parts 9-10 on the short edges 4-5 of the panel from FIG. 28. A downwardly directed interlocking groove 47-48 is present along the entire short edges 4-5 and may be made, for example, in accordance with the alternative method for manufacturing a panel as described above, wherein one or several stationary cutting or milling tools are used to form the downwardly directed interlocking groove 47-48 along the entire short edges 4-5.

Figure 31:
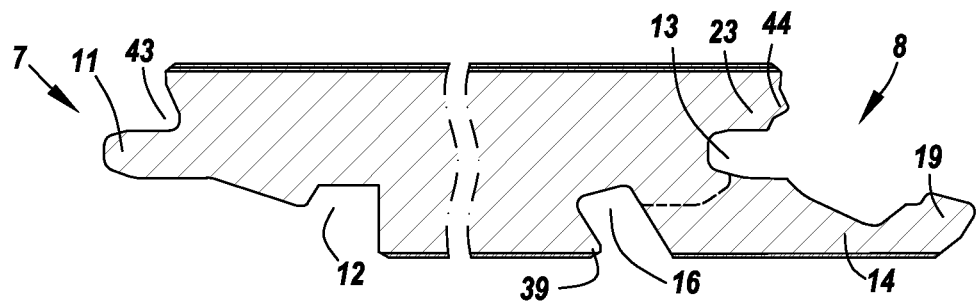
Figure 32:
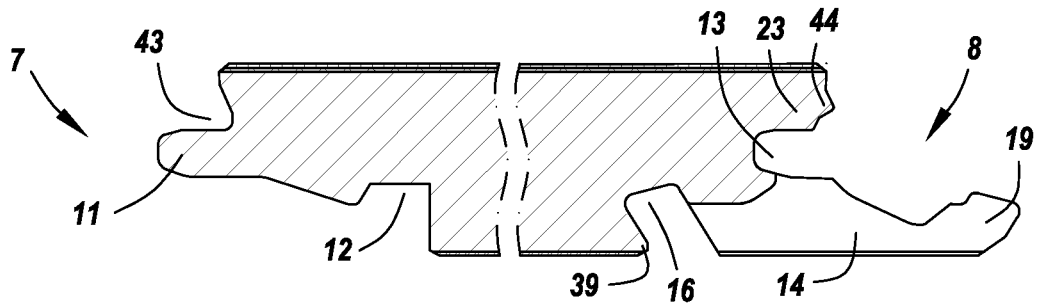
Figure 33:
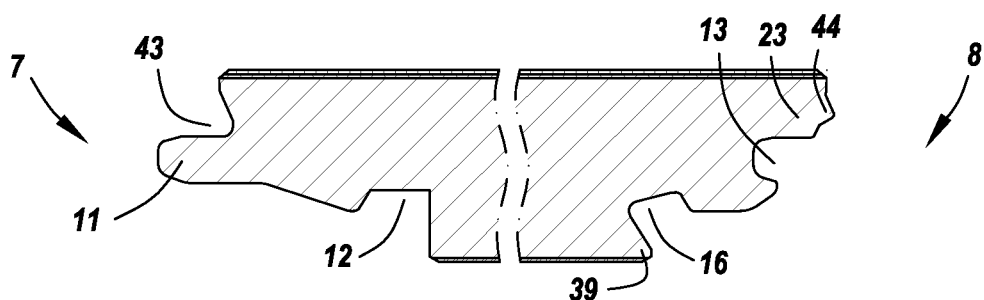

FIGS. 31 to 33 show the coupling parts 7-8 on the long edges 2-3 of the panel from FIG. 28. A downwardly directed interlocking groove 16 is present along the entire other long edge 3 and may be made, for example, in accordance with the alternative method for manufacturing a panel as described above, wherein one or several stationary cutting or milling tools are used to form the downwardly directed interlocking groove 16 along the entire long edge 3.

Figure 34:
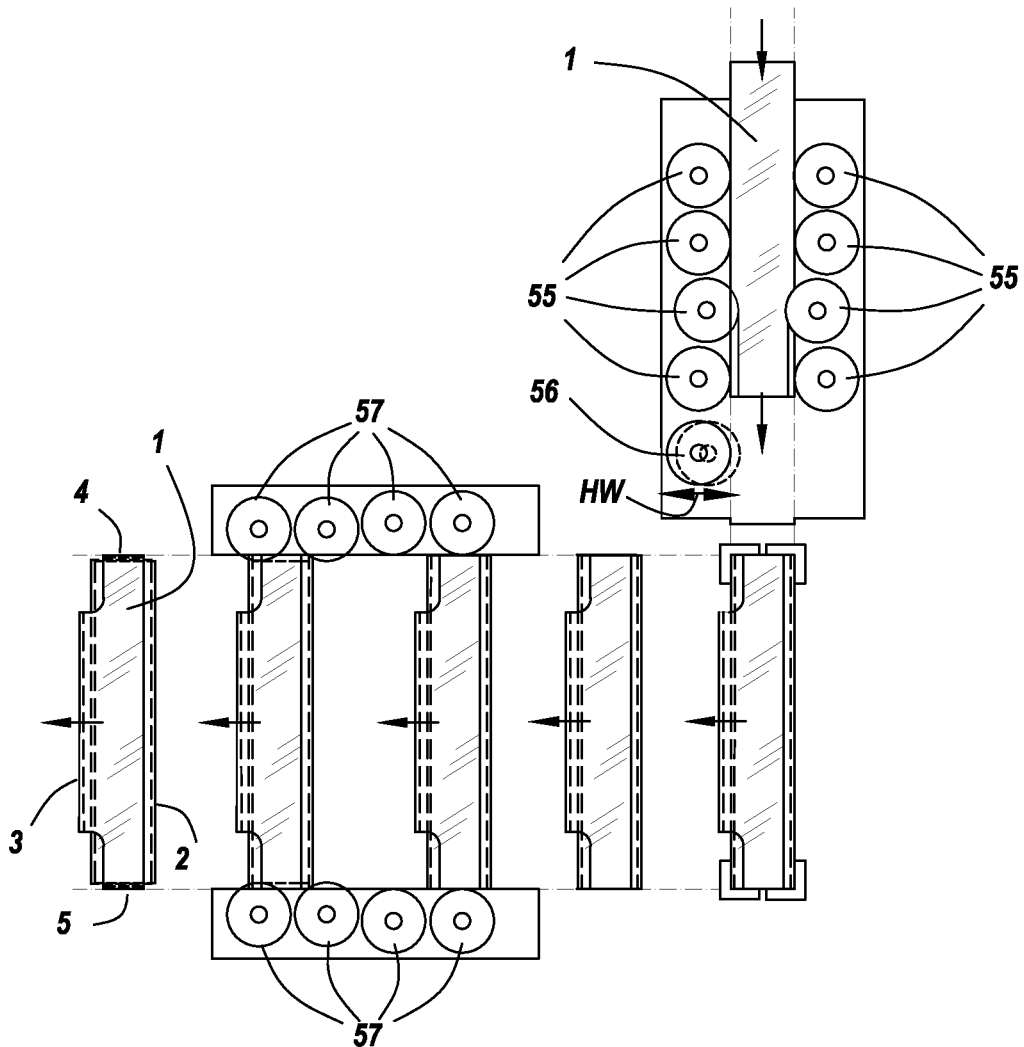
FIG. 34 shows a method according to the invention to manufacture the panel from FIG. 1.

FIG. 34 diagrammatically shows a method according to the invention. The method is used for manufacturing the panel 1 from FIG. 1. The panel 1 is advanced relative to several cutting or milling tools 55-56-57. In this case, the tools 55-56-57 are rotating milling tools. The stationary milling tools 55 are used to form the coupling parts 7-8 on the long edges 2-3. More specifically, the stationary milling tools 55 are used to form the tongue 11 and the downwardly directed interlocking groove 12 on the edge 2, as well as the groove 13 and the interlocking lip 14 on the edge 3. In this case, the interlocking lip 14 is first formed along the entire edge 3. The milling tool 56 moving away from and towards the panel 1 is then used to treat only a part of the edge 3. More specifically, it is used to remove or mill off the interlocking lip 14 on the portions 15 and to produce the downwardly directed interlocking groove 16. The panel 1 then passes along further milling tools 57 in order to treat the short edges 4-5. Stationary milling tools are used to form the coupling parts 9-10.

Figure 35:
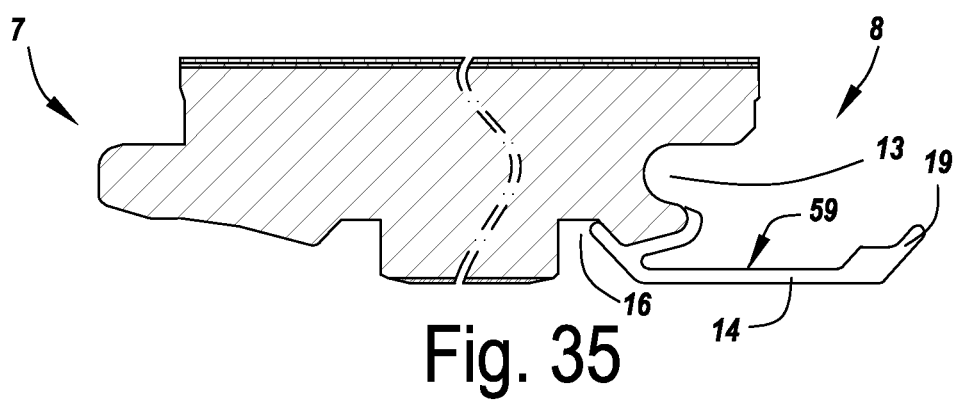
FIG. 35 shows yet another variant of a floor panel according to the first independent aspect in a view similar to that of FIG. 6.
Figure 36:
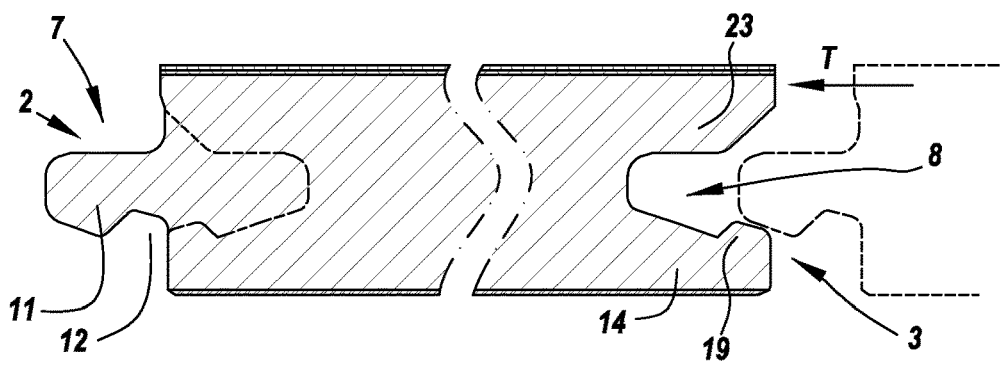
FIGS. 36 to 39 show a floor panel having the features of the second independent aspect in views similar to those of FIGS. 3 to 6, respectively.
Figure 37:
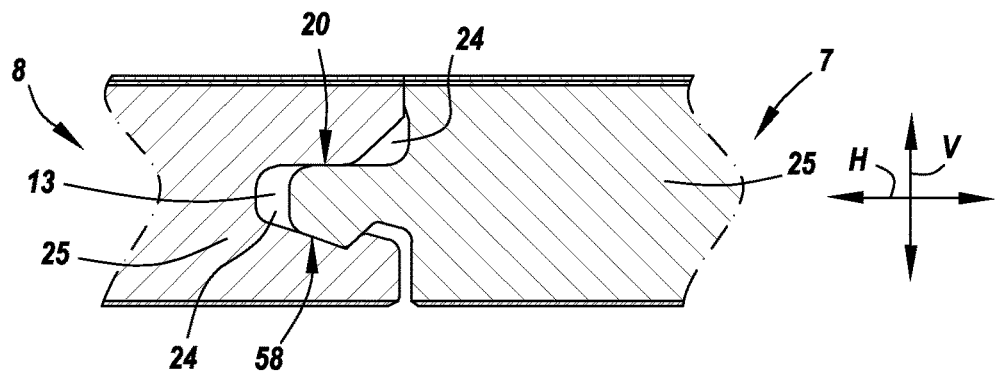
Figure 38:
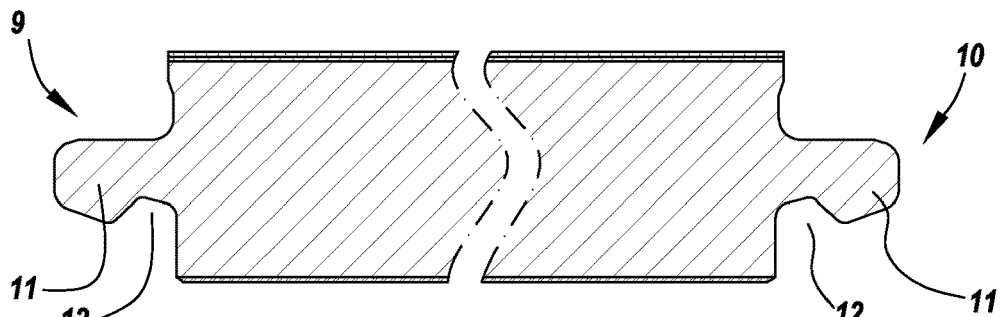

FIG. 35 shows an embodiment which substantially corresponds to the embodiment of FIGS. 1 to 6, but in which the interlocking lip 14 and the upwardly directed interlocking element 19 are formed on the other long edge 3 by a separate strip 59 which, in this case, is mechanically attached to the respective edge 3. The profiling of the panel material on the respective edge 3 is performed using a substantially constant cross section, in this case, with at least the groove 13, but without the interlocking lip 14, while the abovementioned interlocking lip 14 is provided centrally along the respective edge 3, by mechanically attaching a suitable strip 59 on the abovementioned substantially constant cross section. The substantially constant cross section is present along the portions 15 and may cooperate with the coupling parts 9-10 of both short edges 4-5. The portions 15 preferably have, in this case, a length which is at least half the width, or at least the width, of a short edge 4-5. In this way, the short edges 4-5 can be coupled at these ends, i.e. at the location of the portions 15, in order to form a herringbone pattern. Such a length of the portions 15 is also preferred in the other embodiments in the figures, namely also when the interlocking lip 14 forms a single part with the panel material.

FIGS. 36 to 39 show an embodiment according to the second independent aspect of the invention, namely panels 1, wherein the coupling parts 9-10 on both short edges 4-5 comprise a tongue 11. On each long edge 2-3 and on each short edge, the panel comprises a coupling part 7-8-9-10 which allows the panel to be coupled to another similar panel, wherein the coupling parts 7-9-10 on the one long edge 2 and on both short edges 4-5 comprise a tongue 11 and a downwardly directed interlocking groove 12 and wherein the coupling part 8 on the other long edge 3 comprises a groove 13 and an interlocking lip 14. The interlocking lip 14 delimits the respective groove 13 along the bottom and comprises an upwardly directed interlocking element 19. As is indicated, the interlocking lip 14 preferably does not extend beyond the top edge, or the distal end of the top lip 23. If such an interlocking lip 14 does protrude, preferably at least a portion of the upright interlocking element 19 is situated vertically under the top lip 23. The groove 13 is configured to cooperate with the tongue 11 on each of the one long edge 2 and the short edges 4-5 of another similar panel in order to produce a vertical interlocking between the respective edges 2-4-5. The downwardly directed interlocking groove 12 of the one long edge 2 and both short edges 4-5 is configured to cooperate with the upwardly directed interlocking element 19 on the other long edge 3 of another similar panel 1 in order to produce a horizontal interlocking between the respective edges 2-4-5. Thus, the panel makes it possible to form an interlocking tongue-and-groove connection between the other long edge 3 of the panel 1 and the one long edge 2 and the short edges 4-5 of other similar panels 1.

Figure 39:
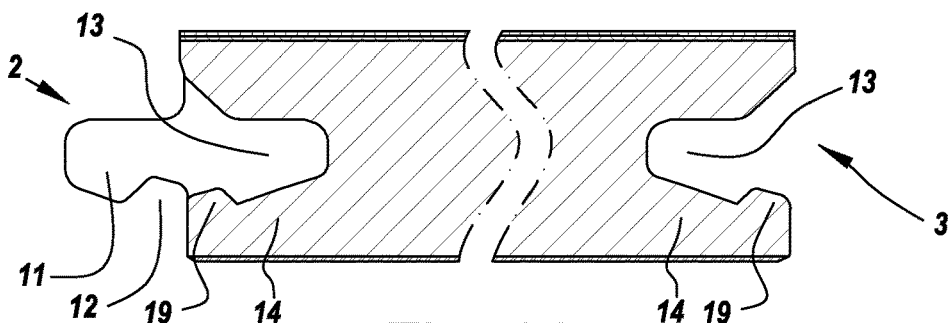

As is illustrated in FIG. 39 (which is a section along VI-VI of FIG. 1), the actual tongue 11 is preferably absent at the one long edge 2 along a portion 15 of the respective long edge 2. The coupling part 7 on the one long edge 2 preferably comprises a groove 13 with an interlocking lip 14 and an upwardly directed interlocking element 19 at the location of the abovementioned portion 15. The upwardly directed interlocking element 19 on the one long edge 2 is preferably configured to cooperate with the downwardly directed interlocking groove 12 on the other long edge 3 and/or on the short edges 4-5 of another similar panel 1 in order to produce a horizontal interlocking between the respective edges 2-3-4-5.

Figure 40:
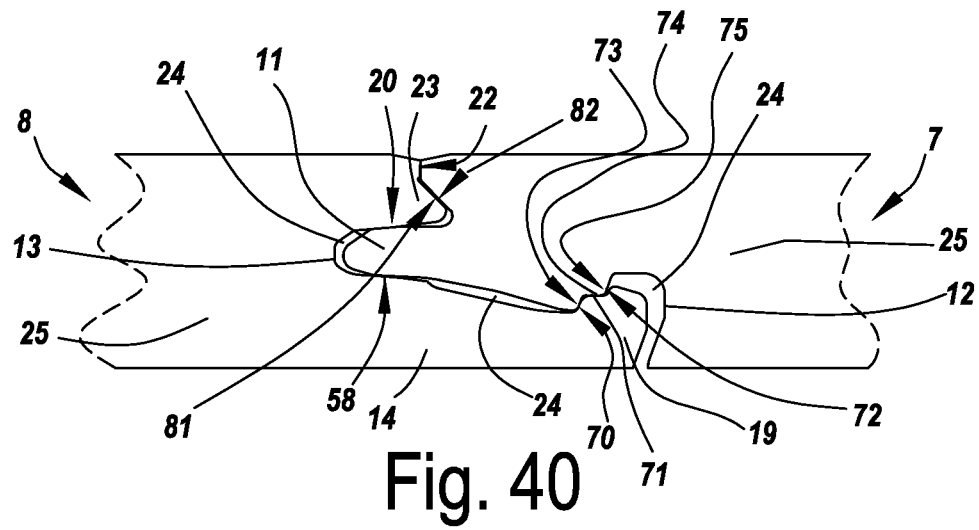
FIGS. 40, 41 and 42 relate to a floor panel according to another embodiment of the first independent aspect of the invention in views similar to those of FIGS. 4, 8 and 9, respectively.
Figure 41:
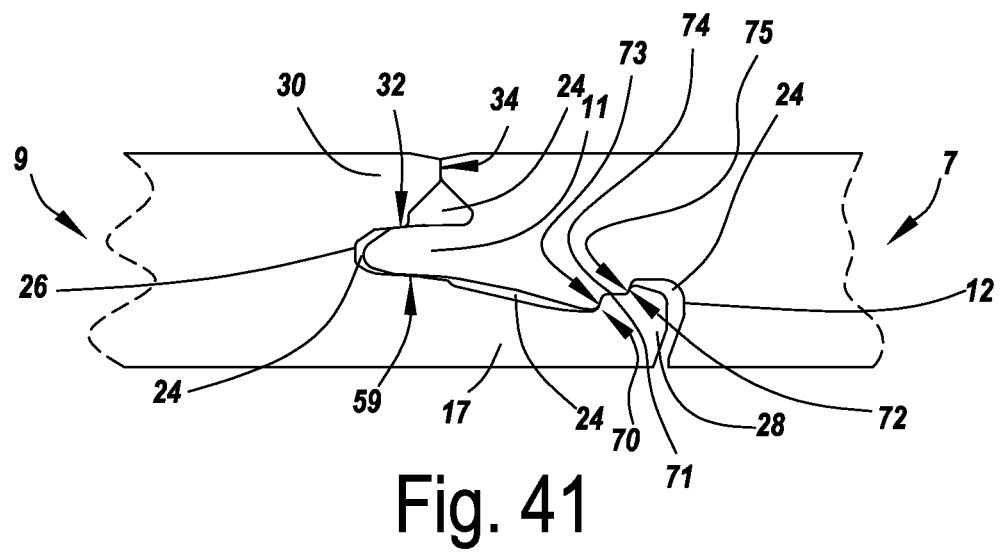
Figure 42:
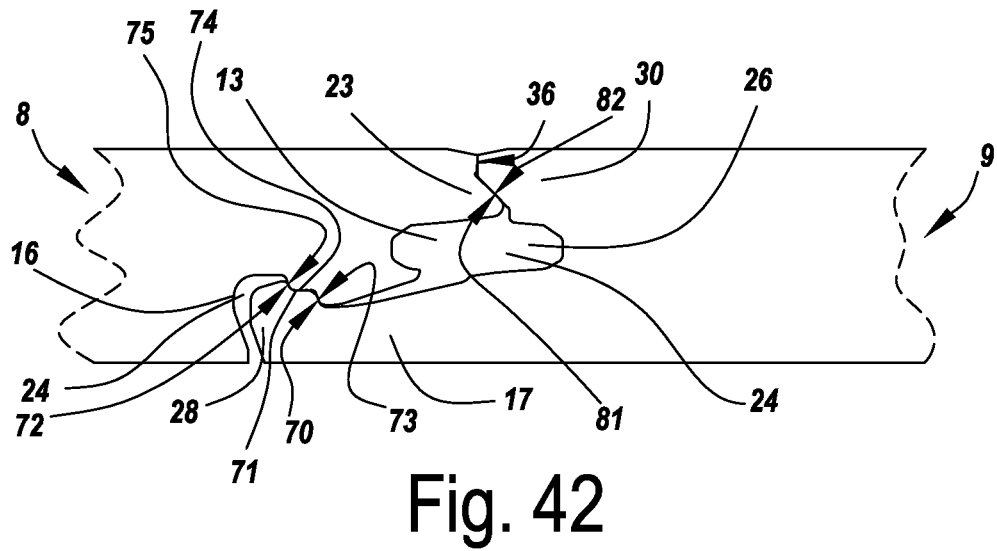

FIGS. 40, 41 and 42 relate to a floor panel according to another embodiment of the first independent aspect of the invention, in views which are similar to those of FIGS. 4, 8 and 9, respectively. Reference numerals which are identical to reference numerals in preceding figures denote the same element.

FIG. 40 shows a cross section along line IV-IV in FIG. 2 and thus illustrates how the coupling parts 7-8 on the coupled long edges 2-3 cooperate.

FIG. 41 shows a cross section along the line VIII-VIII from FIG. 2 and thus shows the cooperation between the coupling part 7 on the long edge 2 and the coupling part 9 on the short edge 4.

The embodiment illustrated in FIGS. 40, 41 and 42 contains some particular characterizing features. On its inner side, the upwardly directed interlocking element (19 and 28-29) of the interlocking lip (14 and 17-18) on each of the other long edge (3) and the short edges (4-5) contains two oblique interlocking surfaces (70, 72) separated by a face (71) which makes a smaller angle with the horizontal direction than the two oblique interlocking surfaces (70, 72). In the example, this face (71) is a surface which runs parallel to the surface of the panel.

The coupling part (7) on the one long edge (2) comprises a tongue (11) and a downwardly directed interlocking groove (12). The downwardly directed interlocking groove (12) contains two oblique interlocking surfaces (73, 75) separated by a face (74) which makes a smaller angle with the horizontal direction than the two oblique interlocking surfaces (73, 75). In the example, this face (74) is a face which runs parallel to the surface of the panel. The oblique interlocking surfaces (70, 72) of the upwardly directed interlocking element (19 and 28) of the interlocking lip (14 and 17) are configured to form a horizontal interlocking together with the oblique interlocking surfaces (73, 75) of the downwardly directed interlocking groove (12).

The coupling parts (8) on the other long edge (3) comprise a groove (13) and an interlocking lip (14), this groove (13) being delimited along the top by a top lip (23). The end of this top lip (23) extends beyond the edge of the panel, also taking into account a possible beveled top side of the panel. The top side of this top lip (23) contains an interlocking surface (81). The coupling parts (7, 9, 10) on the one long edge and on both short sides contain an undercut which comprises an interlocking surface (82). The two interlocking surfaces (81 and 82) are configured to form a vertical interlocking of coupled panels.

In FIG. 42 (which shows a cross section of a coupling along line IX-IX from FIG. 2), the interlocking lip on the other long edge (3) is absent along a portion of the other long edge. At the location of the abovementioned portion (15), the coupling part (8) on the other long edge (3) comprises a downwardly directed interlocking groove (16). This downwardly directed interlocking groove (16) is configured to cooperate with the upwardly directed interlocking element (28-29) on the one and/or other short edge (4-5) of another similar panel in order to produce a horizontal interlocking between the respective edges.

The embodiment illustrated in FIGS. 40-42 has the advantage that, with thin profiles, e.g. having a total thickness of less than 6 mm; preferably less than 5 mm, the long edges of the panels can be coupled to each other by means of a horizontal movement of a first panel relative to a second panel. These panels may also be coupled to each along their long edges or by means of a turning movement.

The present invention is by no means limited to the above-described embodiments, but different variants of such floor panels may be produced without departing from the scope of the present invention.

The invention claimed is:

1. A panel having a rectangular shape, and long and short edges,
wherein the long edges comprise coupling parts configured to couple a first long edge of the panel to a second long edge of another similar panel by a turning movement and/or by a substantially horizontal translational movement;
wherein the coupling parts on the first long edge comprise a tongue, a downwardly directed interlocking groove and an undercut;
wherein the coupling parts on the second long edge comprise a groove, an interlocking lip and a top lip;
wherein the interlocking lip delimits the groove on the second long edge along a bottom and comprises an upwardly directed interlocking element;
wherein the top lip delimits the groove on the second long edge along top;
wherein the tongue is configured to cooperate with the groove on the second long edge of another similar panel in order to produce a first vertical interlocking between the respective edges; and
wherein the downwardly directed interlocking groove is configured to cooperate with the upwardly directed interlocking element on the second long edge of another similar panel in order to produce a horizontal interlocking between the respective edges;
wherein top sides of the respective edges of the coupled panels comprise contact surfaces located above the coupling parts;
wherein the undercut is located, seen according to a direction perpendicular to the panel, between an upper side of the tongue and the respective contact surface, wherein said undercut comprises a first interlocking surface;
wherein a distal end part of the top lip extends beyond the respective contact surface and a top side of the distal end part of the top lip comprises a second interlocking surface;
wherein the undercut is provided to accommodate the distal end part of the top lip, and the first interlocking surface is configured to cooperate with the second interlocking surface in order to produce a second vertical interlocking between the respective edges.

2. The panel in accordance with claim 1, wherein a maximum height of the distal end part of the top lip, is greater than a height of the respective contact surface.

3. The panel in accordance with claim 1, wherein the interlocking lip surpasses the distal end part of the top lip and wherein the upwardly directed interlocking element is situated entirely in a portion of the interlocking lip which is located beyond the distal end part of the top lip.

4. The panel in accordance with claim 1, wherein a top side of the tongue cooperates with a bottom side of the top lip and as such form interlocking surfaces which produce the first vertical interlocking, wherein said interlocking surfaces are oriented horizontally.

5. The panel in accordance with claim 4, wherein a supporting point or supporting surface is formed between a bottom side of the tongue and a top side of the interlocking lip.

6. The panel in accordance with claim 1, wherein at least two air chambers are formed between the coupled edges of the panels, a first air chamber between the tongue and the groove on the second long edge and a second air chamber between the upper side of the tongue and the top lip.

7. The panel in accordance with claim 1, wherein the downwardly directed interlocking groove and the upwardly directed interlocking element cooperate by interlocking surfaces in order to produce the horizontal interlocking between the respective edges, said interlocking surfaces being oriented outwardly seen from bottom to top and according to the groove.

8. The panel in accordance with claim 7, wherein in coupled condition, there is only contact between the downwardly directed interlocking groove and the upwardly directed interlocking element at a height of the interlocking surfaces.

9. The panel in accordance with claim 1, wherein a space is present between the upwardly directed interlocking element and the downwardly directed interlocking groove and no contact is present between a distal most side of the upwardly directed interlocking element and a proximal most side of the downwardly directed interlocking groove.

10. The panel in accordance with claim 1, wherein the short edges comprise coupling parts configured to couple a first short edge of the panel to a second short edge of another similar panel, wherein said coupling parts produce a vertical interlocking and/or a horizontal interlocking between the respective short edges.

11. A panel having a rectangular shape, and long and short edges,
wherein the long edges comprise coupling parts configured to couple a first long edge of the panel to a second long edge of another similar panel by a turning movement and/or by a substantially horizontal translational movement;
wherein the coupling part on the first long edge comprises a tongue and a downwardly directed interlocking groove;
wherein the coupling parts on the second long edge comprise a groove, an interlocking lip and a top lip;
wherein the interlocking lip delimits the groove on the second long edge along a bottom and comprises an upwardly directed interlocking element;
wherein the top lip delimits the groove on the second long edge along top;
wherein the tongue is configured to cooperate with the groove on the second long edge of another similar panel in order to produce a first vertical interlocking between the respective edges; and wherein the downwardly directed interlocking groove is configured to cooperate with the upwardly directed interlocking element on the second long edge of another similar panel in order to produce a horizontal interlocking between the respective edges;

wherein the coupling parts comprise further interlocking elements on a distal end of the top lip and on the edge of the second long edge at a height above the tongue;

wherein the interlocking element on the distal end of the top lip is a projection and the interlocking element on the second long edge is a recess provided to accommodate the projection in order to produce a second vertical interlocking between the respective edges.

12. The panel in accordance with claim 11, wherein top sides of the respective edges of the coupled panels comprise contact surfaces located above the projection and recess, and wherein a maximum height of the recess, is greater than a height of the respective contact surface.

13. The panel in accordance with claim 11, wherein the interlocking lip surpasses the distal end of the top lip and wherein the upwardly directed interlocking element is situated entirely in a portion of the interlocking lip located beyond the distal end of the top lip.

14. The panel in accordance with claim 11, wherein a top side of the tongue cooperates with a bottom side of the top lip and form interlocking surfaces which produce the first vertical interlocking, wherein said interlocking surfaces are oriented horizontally.

15. The panel in accordance with claim 14, wherein a supporting point or supporting surface is formed between a bottom side of the tongue and a top side of the interlocking lip.

16. The panel in accordance with claim 11, wherein at least two air chambers are formed between the coupled edges of the panels, a first air chamber between the tongue and the groove on the second long edge and a second air chamber between an upper side of the tongue and the top lip.

17. The panel in accordance with claim 11, wherein the downwardly directed interlocking groove and the upwardly directed interlocking element cooperate by interlocking surfaces in order to produce the horizontal interlocking between the respective edges, said interlocking surfaces being oriented outwardly seen from bottom to top and according to the groove.

18. The panel in accordance with claim 17, wherein in coupled condition, there is only contact between the downwardly directed interlocking groove and the upwardly directed interlocking element at a height of the interlocking surfaces.

19. The panel in accordance with claim 11, wherein a space is present between the upwardly directed interlocking element and the downwardly directed interlocking groove and no contact is present between a distal most side of the upwardly directed interlocking element and a proximal most side of the downwardly directed interlocking groove.

20. The panel in accordance with claim 11, wherein the short edges comprise coupling parts configured to couple a first short edge of the panel to a second short edge of another similar panel, wherein said coupling parts produce a vertical interlocking and/or a horizontal interlocking between the respective short edges.

* * * * *